(12) United States Patent
Peretz et al.

(10) Patent No.: US 11,969,660 B2
(45) Date of Patent: Apr. 30, 2024

(54) GAMIFICATION DEVICE

(71) Applicant: AnsrBall Technologies, Inc., San Mateo, CA (US)

(72) Inventors: Neil Peretz, San Mateo, CA (US); Scott Fullam, Palo Alto, CA (US)

(73) Assignee: AnsrBall Technologies, Inc., San Mateo, CA (US)

( * ) Notice: Subject to any disclaimer, the term of this patent is extended or adjusted under 35 U.S.C. 154(b) by 0 days.

(21) Appl. No.: 18/162,858

(22) Filed: Feb. 1, 2023

(65) Prior Publication Data

US 2023/0285846 A1    Sep. 14, 2023

Related U.S. Application Data

(63) Continuation of application No. 17/579,868, filed on Jan. 20, 2022, now Pat. No. 11,596,857, which is a continuation of application No. 16/505,678, filed on Jul. 8, 2019, now Pat. No. 11,260,284, which is a continuation-in-part of application No. 15/291,994, filed on Oct. 12, 2016, now abandoned.

(60) Provisional application No. 62/241,069, filed on Oct. 13, 2015.

(51) Int. Cl.
| | |
|---|---|
| A63F 9/18 | (2006.01) |
| G06F 3/03 | (2006.01) |
| G06Q 30/0204 | (2023.01) |
| G06Q 30/0251 | (2023.01) |
| H04W 4/029 | (2018.01) |
| H04W 4/80 | (2018.01) |

(52) U.S. Cl.
CPC .......... *A63F 9/18* (2013.01); *G06Q 30/0204* (2013.01); *G06Q 30/0255* (2013.01); *G06F 3/03* (2013.01); *H04W 4/029* (2018.02); *H04W 4/80* (2018.02)

(58) Field of Classification Search
CPC ........................................................ A63F 9/18
See application file for complete search history.

(56) References Cited

U.S. PATENT DOCUMENTS

| | | | |
|---|---|---|---|
| 6,273,421 B1 * | 8/2001 | Thalheimer | A63H 5/00 273/161 |
| 6,368,176 B1 | 4/2002 | Lozowski et al. | |
| 2009/0259588 A1 | 10/2009 | Lindsay | |
| 2010/0281411 A1 | 11/2010 | Baker et al. | |
| 2011/0239253 A1 | 9/2011 | West et al. | |

(Continued)

FOREIGN PATENT DOCUMENTS

WO    2015148693 A1    10/2015

OTHER PUBLICATIONS

Anand, Joseph, "Magic-8 Ball," Jul. 27, 2015 [retrieved online from https:/Jwww.hackster.io/jospehanad/magic-8-t>all-d84404 on Dec. 4, 2016].

(Continued)

*Primary Examiner* — Robin J Mishler
(74) *Attorney, Agent, or Firm* — Ahmann Kloke LLP

(57) ABSTRACT

A messaging gamification device. A messaging gamification device can include a customizable message provisioning system and a customizable display system. A method of operating a messaging gamification device can include controlling reproduction of content on a customizable display system of the gamification device according to how a user interacts with the gamification device and content presentation rules.

20 Claims, 21 Drawing Sheets

(56) References Cited

U.S. PATENT DOCUMENTS

| | | | |
|---|---|---|---|
| 2012/0211940 A1* | 8/2012 | Schneider | A63H 5/00 |
| | | | 273/138.2 |
| 2012/0223477 A1 | 9/2012 | Zylkin | |
| 2014/0229251 A1 | 8/2014 | Lim et al. | |
| 2015/0223355 A1* | 8/2015 | Fleck | G06F 1/163 |
| | | | 361/679.03 |
| 2015/0360139 A1 | 12/2015 | Watry | |

OTHER PUBLICATIONS

International Application No. PCT/US2016/056761, International Search Report and Written Opinion dated Feb. 17, 2017.
International Application No. PCT/US2020/041201, International Search Report and Written Opinion dated Sep. 8, 2020.

\* cited by examiner

GAMIFICATION DEVICE

CROSS-REFERENCE TO RELATED APPLICATIONS

The present application is a continuation of U.S. patent application Ser. No. 17/579,868 filed Jan. 20, 2022, which is a continuation of U.S. patent application Ser. No. 16/505,678 filed on Jul. 8, 2019, which is a continuation-in-part of U.S. patent application Ser. No. 15/291,994 filed Oct. 12, 2016, which claims priority to U.S. Provisional Patent Application Ser. No. 62/241,069 filed Oct. 13, 2015, which are hereby incorporated by reference herein.

DETAILED DESCRIPTION

Figure 1:
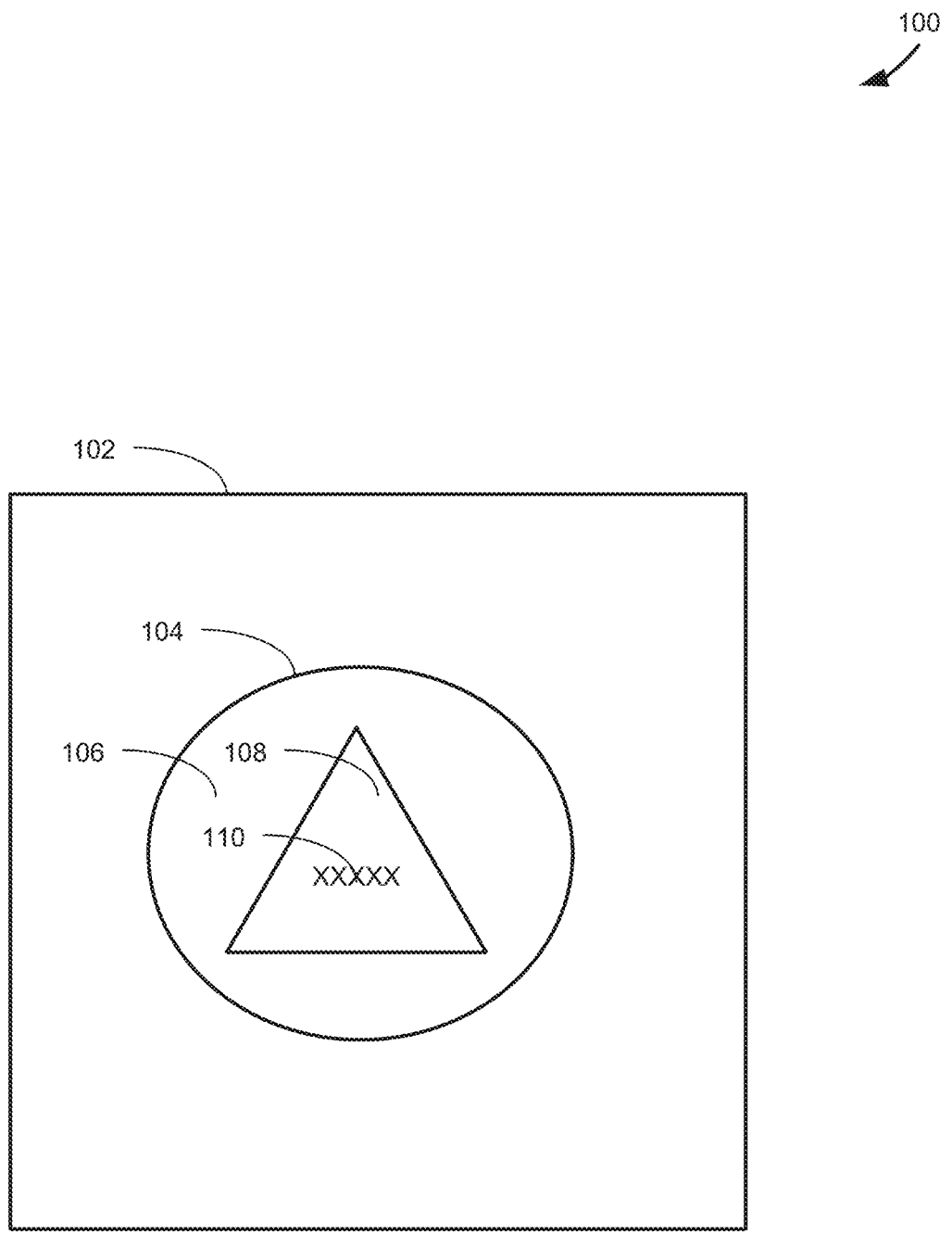
FIG. 1 depicts a front view of an example of a gamification device.

FIG. 1 depicts a front view of an example of a gamification device 100. The gamification device 100 includes a housing 102 enclosing an inner reservoir. The housing 102 can be of an applicable shape. For example, the housing can be a sphere, a cube, a cylinder, or resembling the shape of an object such as a football helmet, a book, or a hockey puck. The housing 102 can be comprised of one or a combination of applicable materials. For example the housing 102 can be comprised of plastic. In various implementations, the housing 102 is of a size to allow for the gamification device 100 to be manipulated by a person, either an adult or a child. For example, the housing 102 can be of a size such that a child can pick up and shake the gamification device 100. The housing 102 can include indicia and ornamental decorations. For example, the housing 102 can include ornamental decorations, such as a sports team logo, painted onto the outer surface of the housing.

The housing 102 contains an inner reservoir. An inner reservoir within the housing 102 contains a liquid 106 in a sealed manner. The liquid 106 contained within an inner reservoir can include a dye to limit the ability to view a die contained within the inner reservoir. The inner reservoir can be of a shape to allow a contained die to move and rotate freely within a contained liquid. In various implementations, an inner reservoir within the housing 102 can be cylindrical shaped. The inner reservoir can have multiple chambers where the die can float into. Each chamber can have its own window 104. An inner reservoir contained within the housing 102 can extend across an entire diameter of the housing 102 or an entire length of the housing 102.

The gamification device 100 includes a window 104 or multiple windows implemented as part of the housing 102. The window 104 functions to allow a person to look inside an inner reservoir contained by the housing 102. Through the window 104 a person can view a customized die and the liquid 106 contained within an inner reservoir. The window 104 can be configured to form part of the inner reservoir. Specifically, the window 104 can form at least a portion of a top, bottom or side of an inner reservoir contained by the housing 102. For example, if an inner reservoir is cylindrically shaped, the window 104 can form a top of the inner reservoir. The window 104 can be comprised of a transparent material. For example, the window 104 can be comprised of an acrylate polymer, a butyrate polymer, or a polycarbonate polymer.

The gamification device 100 includes a customized die 108 contained, along with the liquid 106, by an inner reservoir within the housing 102. The customized die 108 includes at least two distinct faces. Faces of the customized die 108 can be of an applicable shape. For example, faces of the customized die 108 can be triangular shaped, as shown in FIG. 1 of the example gamification device 100. In various implementations, faces of the customized die 108 can be of different shapes. For example a first face of the customizable die 108 can be shaped as a triangle, while a second face of the customized die 108 can be shaped as a square.

The customized die 108 is configured to float within the liquid 106 contained within an inner reservoir. The customized die 108 can be comprised of an applicable material and be of an applicable design to cause the customized die 108 to float within the liquid 106. The die can have a chamber that is filled with air or the die can be constructed from a material that is less dense than the liquid. For example, the customized die 108 can be hollow to cause the customized die 108 to float within the liquid 106. In floating within the liquid 106, when the gamification device 100 is manipulated to specific positions, the customized die 108 floats towards the window 104, where a portion of the customized die 108 comes into contact with the window 104.

The customized die 108 includes indicia or script 110 on at least one of a plurality of faces. The indicia or script 110 can form words or phrases. Depending upon implementation-specific or other considerations, one face of the customized die 108 includes indicia or script while another face of the customized die 108 does not include indicia or script. The indicia or script 110 can be raised with respect to a corresponding face that the indicia or script are present on. As the indicia or script 110 is raised with respect to the face of the customized die 108, when a person (or artificial agent of the person) manipulates the gamification device 100 to a specific position, the customized die 108 floats towards the window 104 and the indicia or script 110 comes into contact with the window 104, where the indicia or script 110 can be viewed while the remaining portions of the customized die 108, including the specific face of the customized die 108, remain hidden by the liquid 106. As a result, the indicia or script 110 appear to "magically" come into view.

In a specific implementation, a person (or artificial agent of a person) can input indicia or script for the customized die 108 through an application or a web-based application. In various implementations, an application can limit or modify the input indicia or script according to either or both the size of the indicia or script or a size of a face that will include the indicia or script. For example, an application can remove words from a message to ensure that the message can fit on a face of the customized die 108. In a specific implementation, an application presents indicia or script for a person to review, which the person can select to be included on the customized die 108.

The customized die 108 is either a modified version of an original die created by a factory that created the gamification device, or a new die that is different from the original die. In manufacturing the gamification device 100, a factory version including an original die is obtained. The housing 102 can be opened and the inner reservoir can be accessed to remove the original die. The customized die 108 can then be placed in the inner reservoir which is sealed again and the housing 102 is closed. Depending upon implementation-specific or other considerations, the liquid 106 can be replaced or replenished while accessing the inner reservoir to remove the original die and place the customized die 108 within the inner reservoir.

The customized die 108 can be created using an applicable 3D printing process. Depending upon implementation-specific or other considerations, the customized die 108 can be created by using 3D printing to modify an original die. For example, script or indicia on an original die can be modified through a 3D printing process to change the script or indicia and subsequently create the customized die 108. Further depending upon implementation-specific or other considerations, the customized die can be created by using 3D printing to generate a new die, which serves as the customized die 108. An original die can be used in generating a model for 3D printing of a new die. For example, a model of a new die can be generated based on a shape and size of an original die. In generating a model of a new die, an original die can be scanned with a 3D scanner or by using a camera and photogrammetry software to generate a digital model of a new die. For example the original die can be scanned with a 3D scanner to create a digital model of a new die in an applicable file format, such as a stereolithography file format. The new die design can be created with CAD software that to an output file that controls a 3-D printer or an engraving or embossing system.

In a specific implementation, the customized die 108 is created through an applicable extrusion deposition based 3D printing process, a 2D printing or embossing process, or engraved using a 3D carving process. In various implementations, the customized die 108 can be created by extruding a thermoplastic material that is heated up and then flowed out of an extruder to generate the customized die 108. For example, small beads of a thermoplastic material can be extruded to form the customized die 108 by controlling the flow of heated thermoplastic from an extrusion nozzle. Examples of thermoplastic materials that can be used to create the customized die through an extrusion deposition based 3D printing process include acrylonitrile butadiene styrene polymers, polycarbonate polymers, polylactic acid polymers, high density polyethylene polymers, PC/ABS polymers, polyphenylsulfone polymers, and high impact polystyrene polymers.

In a specific implementation, the customized die 108 is created through an applicable selective fusing of granular materials based 3D printing process. In various implementations, the customized die 108 can be created by sintering or melting granular material to form the customized die 108. The customized die 108 can be created using an applicable sintering or melting process, such as selective laser sintering, selective laser melting, or electron beam melting. A granular material that is used to generate the customized die 108 can include a polymer. In various implementations, the customized die 108 can be created by binding together granular materials in layers. For example, the customized die 108 can be created by spreading a layer of granular material and depositing a binder based on a design of the customized die to form a layer of the customized die 108. This can be repeated layer by layer until the complete customized die 108 is created.

In a specific implementation, the customized die 108 is created through an applicable stereolithography based 3D printing process. In various implementations, a thin layer of a photopolymer can be deposited in layers that are subsequently cured to form the customized die 108. For example, a liquid photopolymer can be deposited in a thin layer which is then cured through exposure to UV light to solidify the photopolymer layer, and this process is repeated until the customized die is created 108.

In an example of operation of the example gamification device 100 shown in FIG. 1, a person shakes the gamification device 100. This causes the customized die 108 to float within the liquid 106 contained in an inner reservoir within the housing 102. In the example of operation of the example gamification device 100 shown in FIG. 1, the person positions the gamification device to cause the customized die 108 to float towards the window 104. As the gamification device 100 is shaken to cause the customized die 108 to move within the liquid 106 contained in an inner reservoir, it is random which portion of the customized die, corresponding to a specific face of the customized die 108, comes into contact with the window 104 for the person to view. We can alter the density of the material on one or more sides of the die 108 to increase or decrease the probability that a particular die face 302 floats to the top.

Figure 2:
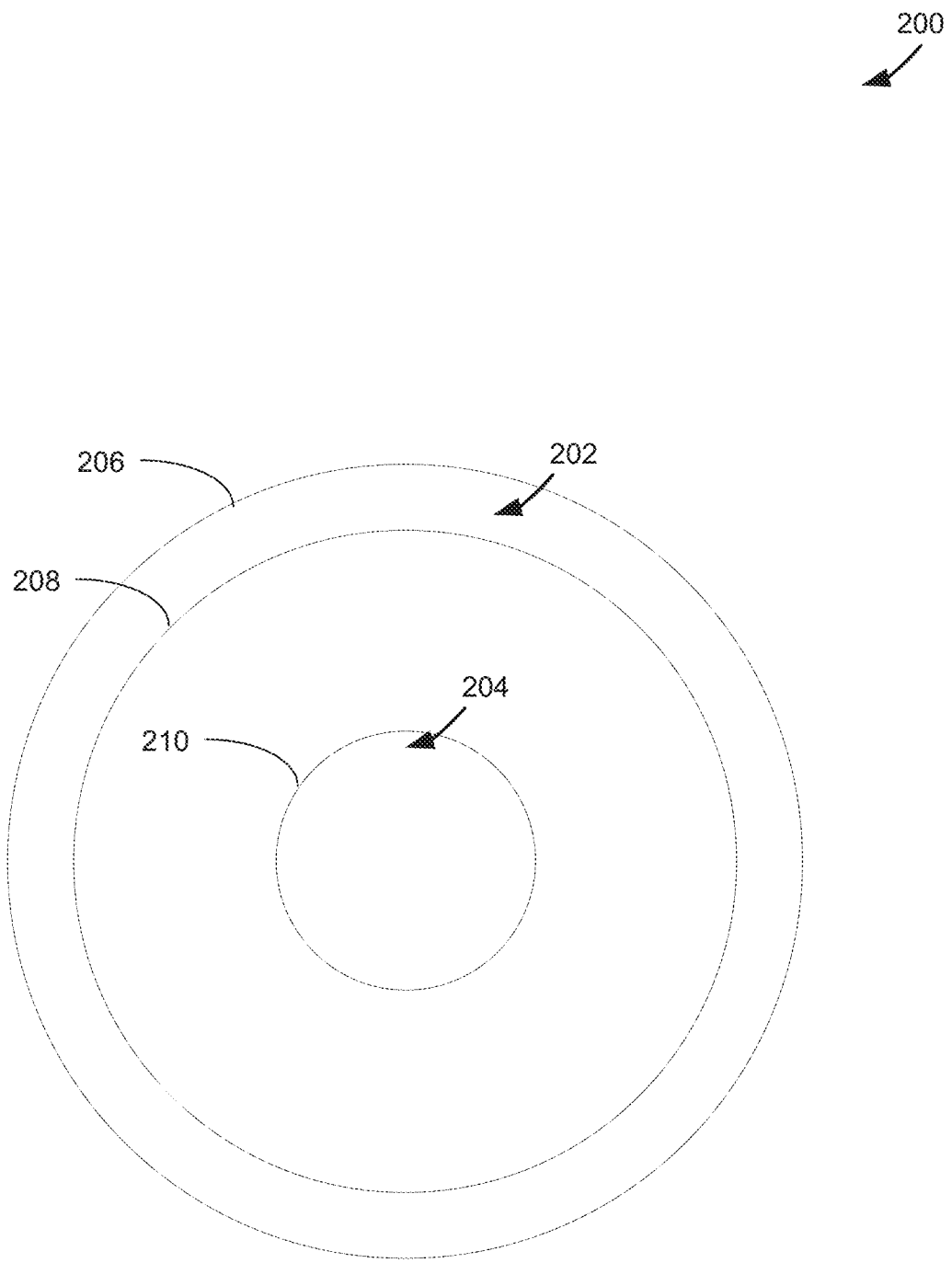
FIG. 2 depicts a cross-sectional view of an example of a gamification device.

FIG. 2 depicts a cross-sectional view of an example of a gamification device 200. The gamification device 200 includes a housing 202 enclosing an inner reservoir 204. While the housing 202 is shown to be of a circular shape, the housing 202 can be of an applicable shape. The housing 202 includes an outer wall 206 and an inner wall 208. The outer wall 206 of the housing 202 is a surface that a person can engage to manipulate the gamification device 200. The outer wall 206 and the inner wall 208 have diameters to define a thickness of the housing 202. The outer wall 206 and the inner wall 208 have diameters to define a thickness of the housing 202 that allows the gamification device 200 to be picked up and manipulated.

The inner reservoir 204 functions to contain a liquid and a customized die. A liquid contained within the inner reservoir 204 can include a dye to limit the view of a contained customized die. While the inner reservoir 204 is shown to be cylindrical in shape, the inner reservoir 204 can be of an applicable shape. The inner reservoir 204 can be of a size to allow a contained customized die to rotate 360° in all directions with respect to the customized die.

The inner reservoir 204 includes a reservoir wall 210 that defines the inner reservoir 204 within the housing 202. While the reservoir wall 210 is shown to be cylindrical, the reservoir wall 210 can be of an applicable shape. The reservoir wall 210 can be of a size to allow a contained customized die to rotate 360° in all directions with respect to the customized die within the inner reservoir 204. The inner reservoir 204 can contain a customized die created using an applicable 3D printing process, such as the 3D printing processes described in this paper.

Figure 3:
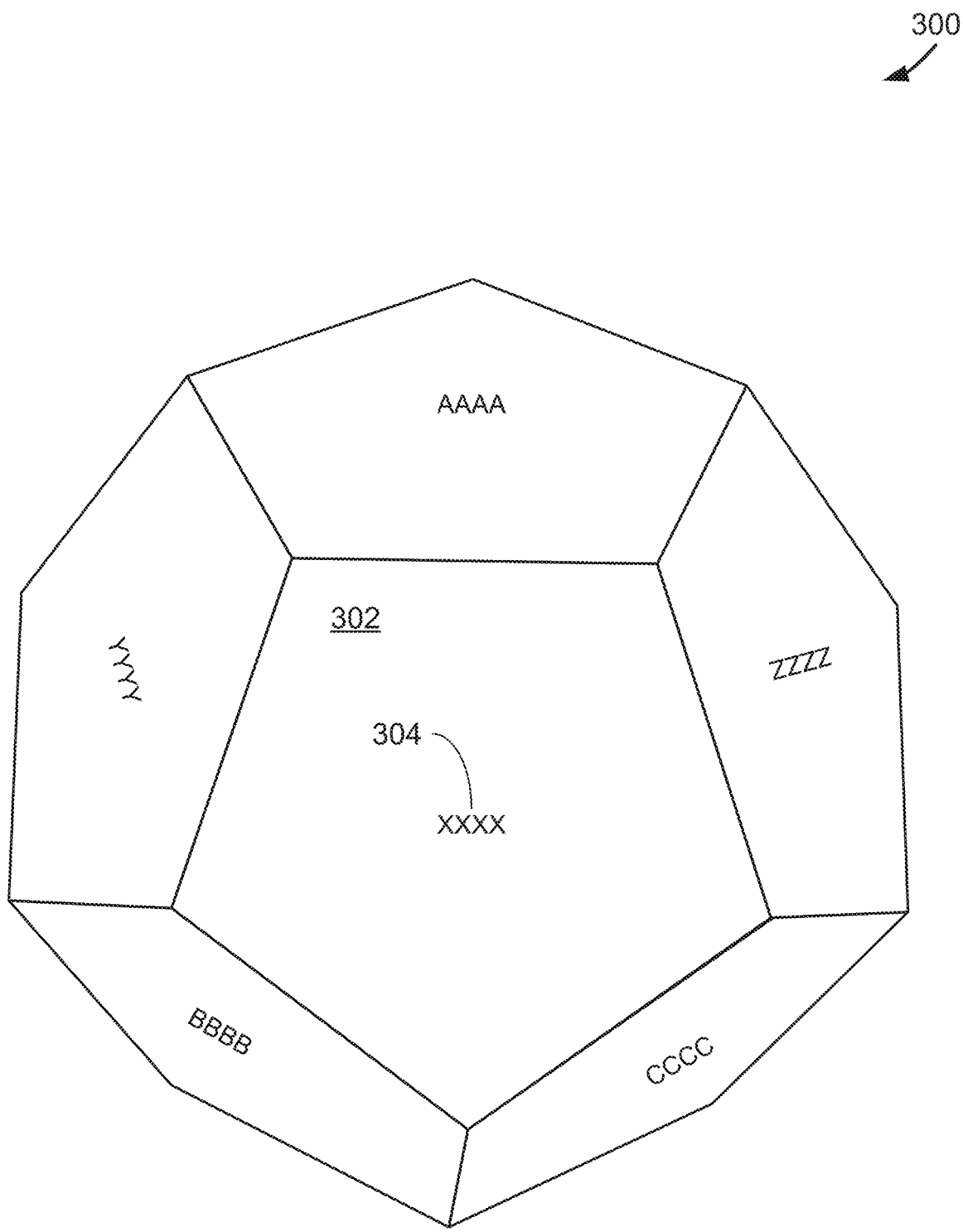
FIG. 3 depicts a front perspective view of an example of a customized die.

FIG. 3 depicts a front perspective view of an example of a customized die 300. The example customized die 300 shown in FIG. 3 is dodecahedron in shape. The customized die 300 can be created using an applicable 3D printing or engraving process, such as the 3D printing processes described in this paper. Depending upon implementation-specific or other considerations, the customized die 300 can be a modified version of an original die, or an entirely new die.

The customized die 300 includes a plurality of faces, e.g. face 302. Each face includes indicia or script 304. Each face can include different indicia or script. Indicia or script can be raised from or engraved into a corresponding face upon which it is positioned. As a result, indicia or script can be viewed when it comes into contact with a window while the remaining portions of the customized die 300, including the other faces and other indicia or script, remain hidden.

Figure 4:
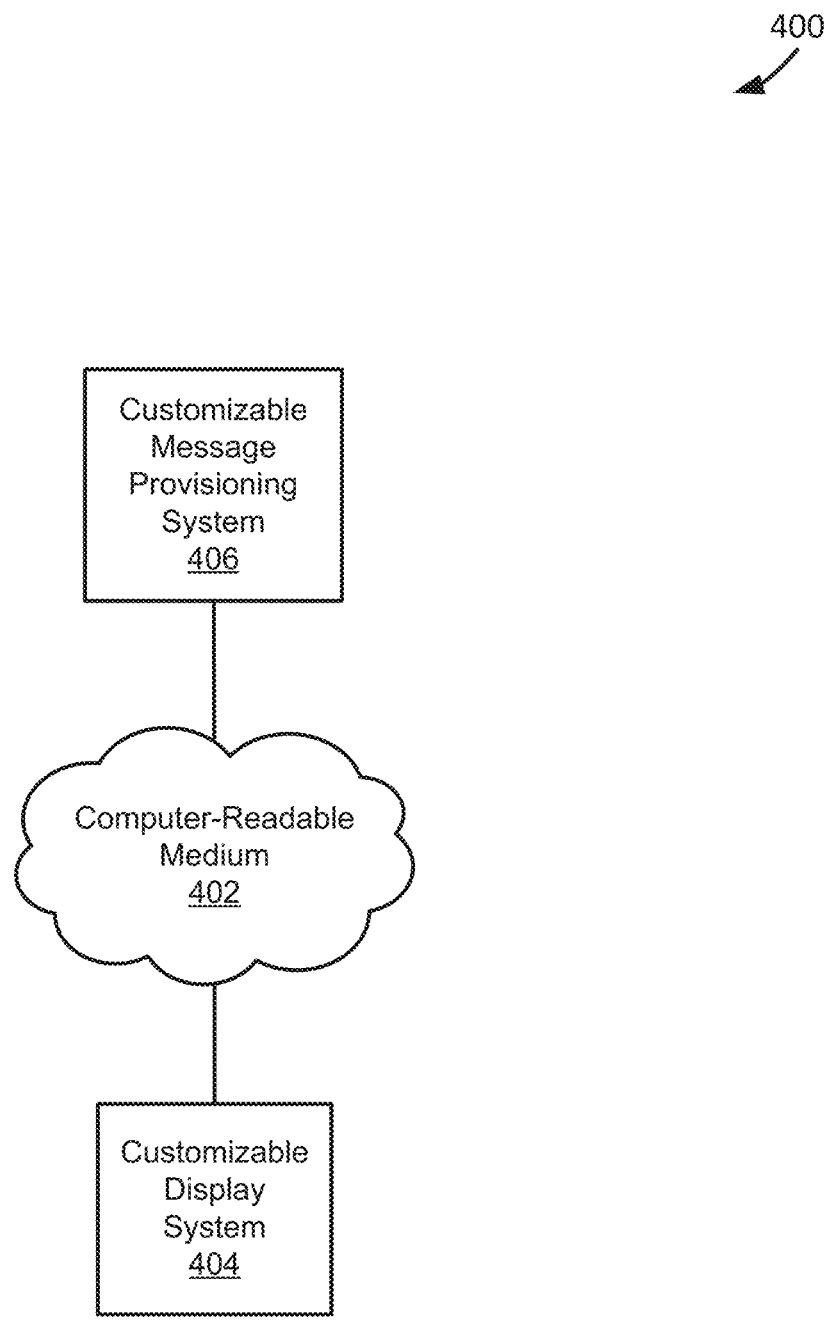
FIG. 4 depicts a diagram of an example of a system for controlling customizable message provisioning in a gamification device.

FIG. 4 depicts a diagram 400 of an example of a system for controlling customizable message provisioning in a gamification device. The system of the example of FIG. 4 includes a computer-readable medium 402, a customizable display system 404, and a customizable message provisioning system 406.

In the example system shown in FIG. 4, the customizable display system 404 and the customizable message provisioning system 406 are coupled to each other through the computer-readable medium 402. As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 402 is intended to represent a variety of potentially applicable technologies. For example, the computer-readable medium 402 can be used to form a network or part of a network. Where two components are co-located on a device, the computer-readable medium 402 can include a bus or other data conduit or plane. Where a first component is co-located on one device and a second component is located on a different device, the computer-readable medium 402 can include a wireless or wired back-end network or LAN. The computer-readable medium 402 can also encompass a relevant portion of a WAN or other network, if applicable.

The computer-readable medium 402, the customizable display system 404, the customizable message provisioning system 406, and other applicable systems or devices described in this paper can be implemented as a computer system, a plurality of computer systems, or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. Another example of operating system software with its associated file management system software is the FreeRTOS operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general-purpose or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

The customizable display system 404 functions to render content for consumption by a person. As part of rendering content for consumption by a person, the customizable display system 404 can function to display customized messages or indicia. The customizable display system 404 can be integrated as part of the gamification devices described in this paper. In various implementations, the customizable display system 404 can replace the customized die described in this paper. As a result, when a person manipulates the gamification devices described in this paper, the person can view a message on a display of the customizable display system 404. In various implementations, the customizable display system 404 is rigidly secured within a gamification device. As a result, when a person manipulates the gamification devices described in this paper, the person views the same display of the customizable display system 404. The customizable display system 404 can be configured to display a plurality of different messages. As a result, a person can see different messages when manipulating a gamification device, to create the appearance that the customizable display system 404 is actually moving within the gamification device as the person manipulates the gamification device. A gamification device integrated with the customizable display system 404 can be an applicable mobile device for displaying messages or indicia to a person. For example, the gamification device can include a smartphone upon which the customizable display system is operated.

In a specific implementation, the customizable display system 404 functions to display messages or indicia using content data. Content data includes applicable data for use by the customizable display system 404 to display associated content for consumption by a person. For example, content data can indicate what content to reproduce and how to reproduce the content. Content data can include data used by the customizable display system 404 to reproduce a phrase. Content data can also include data used by the customizable display system 404 to reproduce an image. Additionally, content data can include data used by the customizable display system 404 to reproduce a sound.

In a specific implementation, the customizable display system 404 functions to display messages or indicia based on interaction data. Interaction data includes applicable data signifying interaction by a person (or artificial agent of a person) with the customizable display system 404 or a gamification device integrated with the customizable display system 404. For example, interaction data can include data indicating certain sounds made by a person in interacting with a gamification device. In another example, interaction data can include data indicating how a person has physically manipulated a gamification device. In displaying message or indicia based on interaction data, the customizable display system 404 can receive presentation instructions according to the interaction data, and subsequently display content according to the presentation instructions. For example, if interaction data indicates a person has moved the customizable display system 404, then the customizable display system 404 can receive presentation instructions indicating to display a new message and subsequently display the new message.

In a specific implementation, the customizable display system 404 functions to display messages or indicia based on content presentation rules. Content presentation rules include applicable rules for managing reproduction of content through the customizable display system 404. For example, content presentation rules can specify messages or indicia to display, whether to display the messages or indicia pseudo-randomly, conditions for displaying messages or indicia, and sounds to reproduce, e.g. when specific messages or indicia are displayed in response to interaction with a gamification device. For example, content presentation rules can specify to display a specific message when a person moves or shakes a gamification device, including the customizable display system 404. Reproduction of content, as used in this paper, refers to presenting content in a form in which it is capable of being perceived by a person (or an artificial agent of a person). For example, reproduction of content can include displaying a message or playing a sound.

In a specific implementation, content data specifies a list of indicia or messages to display to a person. Additionally, content presentation rules can specify rules for displaying indicia or messages within a list of indicia or messages included as part of content data. For example content presentation rules can specify to display a first message if a person shakes a gamification device, and to display a second message if the person (or another person) shakes the gamification device again within thirty seconds of first shaking the gamification device.

In a specific implementation, content data specifies a riddle and hints to the riddle to present to a person. Additionally, content presentation rules can specify rules for displaying a riddle and hints to the riddle to a person. For example, content presentation rules can specify to display a hint to a riddle if a person fails to interact with a gamification device for a certain amount of time after being displayed the riddle. In another example content presentation rules can specify to display a hint to a riddle if a person moves or shakes a gamification device after being presented with the riddle.

In a specific implementation, content data for use in reproducing content can be provided, or otherwise made available to a person, in response to a stimulus. Example stimuli include rewards for actions taken by a person and the purchasing of a right to use the content. For example, a person (or artificial agent of a person) can purchase a right to display a list of indicia or messages, and content data and associated content presentation rules for the list of indicia or messages can be provided to an applicable system for managing display of the list of indicia or messages, such as the customizable message provisioning systems described in this paper.

In a specific implementation, content presentation rules include instructions for use in selectively displaying an advertisement to a person (or artificial agent of a person) through the customizable display system 404. In being used in selectively displaying advertisements, as indicated by content data, content presentation rules can specify when to display an advertisement to a person. For example, content presentation rules can specify to display an advertisement for a specific entity, when a person is determined to be located next to a store of the entity. In another example, content presentation rules can specify to display an advertisement pseudo-randomly, after a specific message or indicia is displayed to a person, or after a specific number of messages or indicia have been displayed to a person.

In a specific implementation, content presentation rules and content is specific to a persona of a user or otherwise associated with a persona of a user. A persona of a user is a user group a user has been or can be divided into based on market segmentation variables. Market segmentation variables include demographic, geographic, psychographic, behavioristic variables. For example, values of market segmentation variables can include an ethnicity and an age of a user. In another example, values of market segmentation variables can include activities a user likes performing, wants to perform, or has performed. A user group users can be segmented into can include only one user or a plurality of users. In being specific to a persona of a user, content presentation rules can be applied according to the persona of the user. For example, content presentation rules for users living in a region can be applied to a user if it is determined the user lives in the region. In another example, content presentation rules can specify displaying certain advertisements to a user if the user is a male living within a certain region. In another example, advertisements can only be presented to users living within a specific region.

In a specific implementation, content presentation rules include instructions for use in facilitating promotions or the giving, potentially for free, of goods or services. In facilitating promotions or the giving of goods or services, the content presentation rules can specify when to give a person a promotion, or give a person goods or services. For example, the content presentation rules can specify to pseudo-randomly award a free drink to a person. Further, in facilitating promotions or the giving of goods or services, the content presentation rules can specify to display an indicator, as represented by content data, of the promotion or won goods or services to a person. Additionally, the content presentation rules can specify notifying an entity or system for provisioning won goods or services to actually provision the awarded goods or services. For example, content presentation rules can specify instructing a company to send an electronic gift certificate to a person. Content presentation rules can set time limits on the giving of promotions, goods, or services. For example, content presentation rules can specify offering a person a promotion only once daily.

In a specific implementation, the customizable display system 404 includes a display affixed to a window of a gamification device. In various implementations, the window is colored to give the appearance the window provides a view to an interior reservoir containing a liquid. A display of the customizable display system 404 can be an applicable digital display, such as an LED display. In various implementations, the customizable display system 404 is configured to use a backlight of a display or edge light source to cause a message displayed on the display to gradually fade into and out of the display. The color of the backlight or edge light source can be varied and controlled by the CPU. As a result, a person is led to feel as if there is a die encased in a liquid chamber in the device.

In a specific implementation, the customizable display system 404 is self-powering by utilizing a self-contained energy generator. Depending upon implementation-specific or other considerations, the customizable display system 404 can include a movement activated electrical generator. The movement activated electrical generator functions according to an applicable motion charger for creating electricity as it is moved. As a result, when a person manipulates a gamification device including the customizable display system 404, electricity is generated that can be used to power the customizable display system 404. Further depending upon implementation-specific or other considerations, the customizable display system includes a solar electrical generator. A solar electrical generator functions according to an applicable generator for generating power using sunlight. In various implementations, the customizable display system 404 includes a battery for storing generated electricity, a thermo-electric generator, radio frequency energy harvesting circuits to gather radio frequency energy broadcasted by devices like WiFi routers, cell phones, and AM/FM radio stations.

In a specific implementation, the customizable display system 404 is battery powered. A battery used to power the customizable display system 404 can be rechargeable or disposable. A gamification device utilizing the customizable display system 404 can include a battery terminal that a person can utilize to couple and decouple a battery to the customizable display system 404.

In a specific implementation, the customizable display system 404 includes a wireless interface through which the customizable display system 404 can send and receive data. A wireless interface of the customizable display system 404 can be an applicable interface for establishing a wireless communication channel, e.g. a Bluetooth® interface. A wireless communication channel can be used to send interaction data from the customizable display system 404. For example, if a person shakes the customizable display, then interaction data indicating the person shook the customizable display system 404 can be sent from the customizable display system 404 using a wireless interface. Further, in various implementations, the customizable display system 404 can receive presentation instructions through a wireless interface. For example, the customizable display system 404 can receive presentation instructions through a wireless interface indicating to display a specific message at the customizable display system 404.

In a specific implementation, the customizable display system 404 includes an orientation sensor. An orientation sensor is configured to determine if the customizable display system 404 or a gamification device integrating the customizable display system 404 has been manipulated to change its orientation and subsequently to cause the customizable display system 404 to display a message or indicia or change a previously displayed message or indicia to another message or indicia. For example, if the customizable display system 404 or a gamification device integrating the customizable display system 404 are turned over, then the orientation sensor can sense that the orientation of the customizable display system 404 or the gamification device integrating the customizable display system 404 has been changed. An orientation sensor, included as part of the customizable display system 404, can be used to generate interaction data, which can be provided to an applicable system for use in managing rendering of content at the customizable display system 404.

In a specific implementation, the customizable display system 404 includes environmental sensors for determining environmental conditions of the environment surrounding the customizable display system 404 or a gamification device integrating the customizable display system 404. Environmental conditions, as indicated by environmental conditions data, can include environmental characteristics of an environment around the gamification device. Example environmental characteristics include, characteristics of a user operating a gamification device with the integrated customizable display system 404, a surrounding temperature of the gamification device, a surrounding pressure of the gamification device, a date, a time of day, and a location of a gamification device with the integrated customizable display system 404. For example, environmental surroundings can include electrical properties of the skin of a person in contact with a gamification device with the integrated customizable display system 404. In various implementations, the customizable display system 404 is configured to display messages or indicia according to environmental conditions detected by environmental sensors. For example, if environmental sensors determine that a surrounding temperature has increased above a threshold value, then the customizable display system 404 can display the message "It is hot in here." In another example, if environmental sensors determine that air pollution in the surrounding area has increased above a threshold value, then the customizable display system 404 can display the message "Stay indoors."

In a specific implementation, the customizable display system 404 includes an electroacoustic transducer that converts electrical signals into audio sounds. An electroacoustic transducer can generate sounds according to content presentation rules. For example, if content presentation rules specify to reproduce specific sounds when a word is displayed through the customizable display system 404, then an electroacoustic transducer can reproduce the specific sounds when the word is displayed. In various implementations, an electroacoustic transducer can use interaction data in reproducing sounds. Further, in various implementations, an electroacoustic transducer can reproduce a sound according to environmental conditions detected by environmental sensors. For example, if environmental sensors determine that a surrounding temperature has increased above a threshold value, then an electroacoustic transducer can reproduce the sound of sizzling food.

The customizable message provisioning system 406 functions to manage a customizable display system in presenting customized messages or indicia. All or portions of the customizable message provisioning system 406 can be implemented on or otherwise as part of a gamification device integrated with a customizable display system. In managing a customizable display system, the customizable message provisioning system 406 can communicate with the customizable display system over a wired or wireless communication channel to control the display of customized messages or indicia. For example, the customizable message provisioning system 406 can communicate with a customizable display system using Bluetooth®. Additionally, the customizable message provisioning system 406 can be implemented as part of a native application or a web based application. For example, the customizable message provisioning system 406 can be a native application residing on a gamification device incorporating a customizable display system or the customizable display system itself.

In a specific implementation, the customizable message provisioning system 406 functions to maintain content data. The customizable message provisioning system 406 can provide maintained content data to an applicable system for rendering content, such as the customizable display systems described in this paper. The customizable message provisioning system 406 can maintain content data based on input receive from a person (or human or artificial agent of a person). For example, a person can input a list of customized messages to display, and the customizable message provisioning system 406 can generate content data indicating the list of customized messages. In another example, an advertiser can input an advertisement to display, and the customizable message provisioning system 406 can generate content data indicating the advertisement to display.

In a specific implementation, the customizable message provisioning system 406 functions to generate content data based on external sources. External sources can include sources related to a user or unrelated to a user. For example, external sources can include a social media profile of a user. In another example, external sources can include a search engine. In another example, the customizable message provisioning system 406 can determine from a search engine trending search terms and include the trending search terms in content data. In various implementations, the customizable message provisioning system 406 can limit or modify indicia or script that a person (or human or artificial agent of a person) inputs according to either or both the size of the indicia or script or a size of a face that will include the indicia or script. For example, an application can remove words from a message input by a person to ensure that the message can fit on a display.

In a specific implementation, the customizable message provisioning system 406 functions to generate and send presentation instructions to a customizable display system, for use in controlling rendering of content. Presentation instructions include an instruction render content, e.g. to display a customized message or indicia. For example, the customizable message provisioning system 406 can send a presentation instruction to display a riddle at a customizable display system, and the customizable display system can display the riddle, using content data indicating the riddle, in response to receiving the presentation instruction. Presentation instructions can also include an instruction to reproduce a sound. For example, if content presentation rules indicate to reproduce a sound of sizzling food when a temperature, as indicated by environmental conditions data, reaches above a threshold temperature, then the customizable message provisioning system 406 can send a presentation instruction indicating to reproduce the sound of sizzling food.

In a specific implementation, the customizable message provisioning system 406 functions to generate and send presentation instructions to a customizable display system based on input received from a person (or a human or artificial agent of a person). For example, a person can input to display a customized message, and the customizable message provisioning system 406 can generate and send presentation instructions indicating to display the customized message. For example, the customizable message provisioning system 406 can receive input from a person to display a message of "it is hot," and subsequently generate and send a presentation instruction indicating to display the message "it is hot," to an applicable system for rendering content, such as the customizable display systems described in this paper.

In a specific implementation, the customizable message provisioning system 406 functions to maintain content presentation rules for controlling content rendering using a customizable display system. As part of maintaining content presentation rules, the customizable message provisioning system 406 can maintain content presentation rules data indicating content presentation rules. The customizable message provisioning system 406 can maintain content presentation rules according to received input. For example, a person who inputs a list of messages to display can specify an order in which to display the messages. Additionally, the customizable message provisioning system 406 can maintain content presentation rules absent instruction from a person (or a human or artificial agent of a person). For example, the customizable message provisioning system 406 can set a display order of messages in a list as pseudo-random.

In a specific implementation, the customizable message provisioning system 406 functions to generate and send presentation instructions to a customizable display system according to content presentation rules. For example, if content presentation rules indicate to display a new specific message when a person shakes a customizable display system or a gamification device integrating the customizable display system, and the person actually shakes the customizable display system, then the customizable message provisioning system 406 can send a presentation instruction to the customizable display system indicating to present the new specific messaged. In another example, if content presentation rules indicate to render a sound of sizzling food when a temperate at a customizable display system increases above a threshold temperature, and the temperature increases above the threshold temperature, then the customizable message provisioning system 406 can send a presentation instruction indicating to reproduce the sound of sizzling food at the customizable display system.

In a specific implementation, the customizable message provisioning system 406 functions to receive either or both interaction data and environmental conditions data. For example, the customizable message provisioning system 406 can receive interaction data from orientation sensors integrated as part of a customizable display system. In another example, the customizable message provisioning system 406 can receive environmental conditions data from environmental systems integrated as part of a customizable display system.

In a specific implementation, the customizable message provisioning system 406 functions to generate and send presentation instructions based on either or both of received environmental conditions data and interaction data. For example, if environmental conditions data indicates a temperature at a customizable display system 404 has risen above a threshold temperature, then the customizable message provisioning system 406 can generate presentation instructions indicating to display a message of "It is hot in here." In generating and sending presentation instructions based on either or both of received environmental conditions data and interaction data, the customizable message provisioning system 406 can generate and send the presentation instructions according to content presentation rules. For example, if content presentation rules indicate to send presentation instructions indicating to display a specific message after a person shakes a customizable display system, and interaction data indicates the person has shook the customizable display system, then the customizable message provisioning system 406 can send presentation instructions indicating to display the specific message.

In a specific implementation, the customizable message provisioning system 406 functions to manage rendering of content on a customizable display system according to input from a primary user. For example, a primary user can specify that only input from certain users is to be followed when generating and sending presentation instructions. In another example, a primary user can specify that only input from certain users is to be followed when maintain content presentation rules or content data. A primary user can include an owner of a gamification device integrated with a customizable display system.

In a specific implementation, the customizable message provisioning system 406 functions to send data to a customizable display system that is used to recognize the customizable message provisioning system 406. For example, the customizable message provisioning system 406 can send a code to a customizable display system that is used to recognize the customizable message provisioning system 406. Further in the example, the customizable display system can send an acknowledgment that the code matches a code at the customizable display system, thereby performing a hand shake like authentication. As a result, the chances of rogue devices connecting to a customizable display system and corrupting the customizable display system are reduced.

In an example of operation of the example system shown in FIG. 4, the customizable display system 404 receives content data and for use in controlling display of customized messages at the customizable display system 404. In the example of operation of the example system shown in FIG. 4, the customizable message provisioning system 406 receives interaction data from the customizable display system 404 based on interaction with the customizable display system 404. Further, in the example of operation of the example system shown in FIG. 4, the customizable message provisioning system 406 sends presentation instructions for controlling presentation of the customized messages based on the received interaction data.

Figure 5:
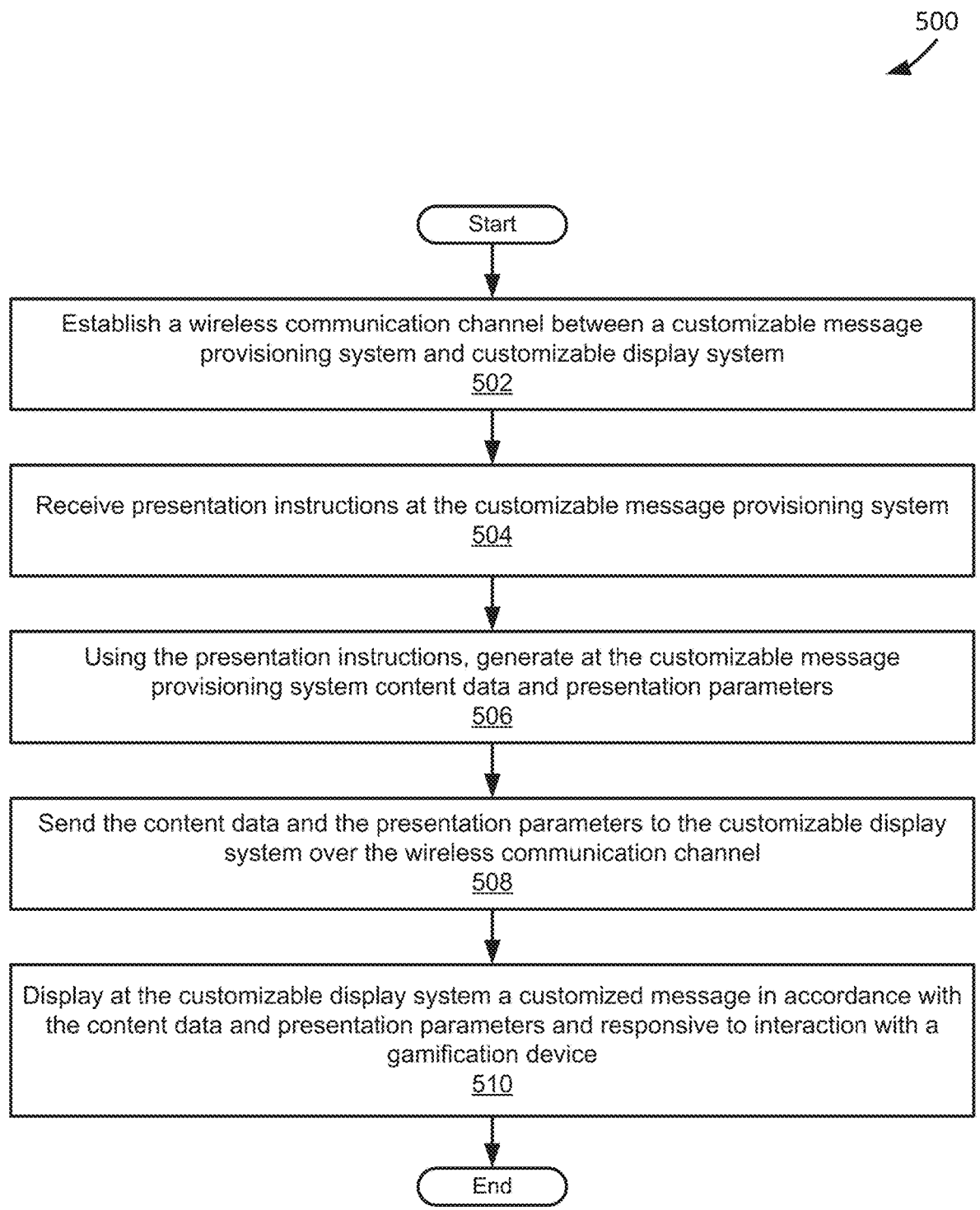
FIG. 5 depicts a flowchart of an example of a method for controlling a customizable display system integrated as part of a gamification device.

FIG. 5 depicts a flowchart 500 of an example of a method for controlling a customizable display system integrated as part of a gamification device. The flowchart 500 begins at module 502 where a wireless communication channel is established between a customizable message provisioning system and a customizable display system integrated as part of a gamification device. An applicable wireless communication channel can be established using applicable wireless interfaces, e.g. Bluetooth® interfaces.

The flowchart 500 continues to module 504, where input from a person (or artificial agent of a person) regarding interaction with the customizable display system is received at the message provisioning system. Depending upon implementation-specific or other considerations, input can be received from a plurality of people or from a single person, e.g. a primary user. Input can indicate messages to display, sounds to reproduce, and/or interaction control conditions for displaying messages or reproducing sounds.

The flowchart 500 continues to module 506, where content data and presentation instructions are generated at the customized message provisioning system based on the input received at module 504. For example, if input indicates to display the phrase "it is hot," when a surrounding temperature exceeds a threshold temperature, then content data can be created to display the phrase "it is hot," and presentation instructions can be generated specifying to display the phrase when the surrounding temperature exceeds the threshold temperature.

The flowchart 500 continues to module 508, where the content data and the presentation instructions are sent to the customizable display system over the wireless communication channel. After being received at the customizable display system, the content data and the presentation instructions can be saved at the customizable display system for use in operation of the customizable display system integrated as part of the gamification device.

The flowchart 500 continues to module 510, where interaction with the customizable display system and the gamification device is controlled according to the presentation rules using the content data. In various implementations, in controlling interaction, message or indicia can be displayed on a display of the customizable display system when a person changes the orientation of the customizable display system and/or the gamification device. Further, in various implementations, in controlling interaction, a sound can be reproduced by the customizable display system when a person changes the orientation of the customizable display system and/or the gamification device.

Figure 6:
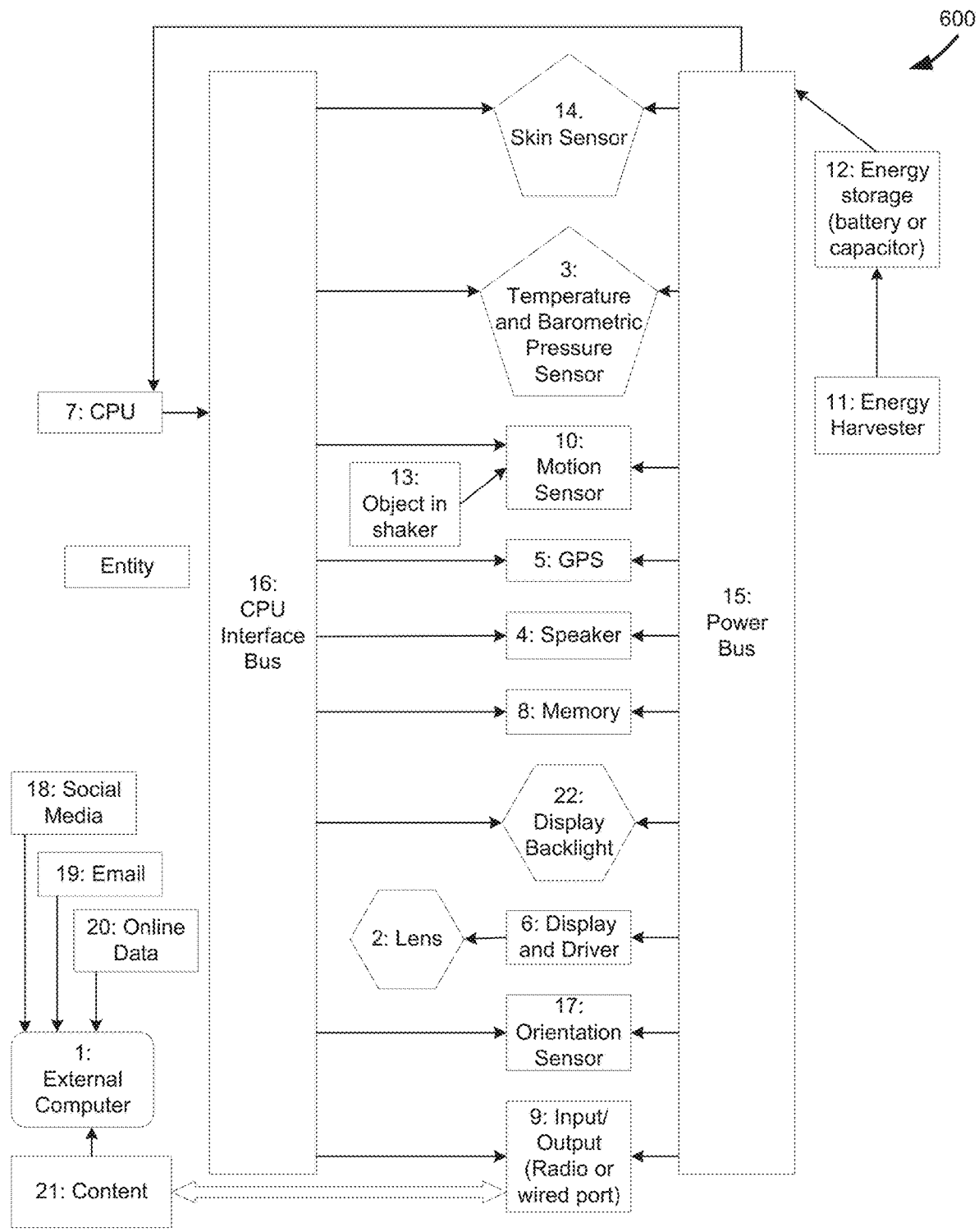
FIG. 6 depicts a diagram of an example of a message provisioning system and a customizable display system integrated as part of a gamification device.

FIG. 6 depicts a diagram 600 of an example of a customizable message provisioning system and a customizable display system. The message provisioning system and the customizable display system in the example system shown in FIG. 6 can functions according to the message provisioning systems and the customizable display systems described in this paper. The customizable display system in the example system shown in FIG. 6 can be integrated as part of the gamification devices described in this paper.

In a specific implementation, a user utilizes an external computer 1 to input messages, characters, symbols, and numbers that can be displayed on the device display 6. The external computer 1 can function according to the computer systems described in this paper. The external computer 1 contains or accesses software that limits the amount of text or symbols to ensure that the inputted characters and symbols will fit on the display 6 within the device. The external computer 1 contains or accesses software that adjusts the graphical resolution of images to ensure that the images will fit on the display 6 within the device. The external computer 1 can receive text, symbols, and graphics sent to it by or extracted from social media 18 services, such as Twitter® and Facebook®, e-mail 19, online data 20, such as databases of song lyrics, and user inputted or selected text, symbols, or images 21. The external computer 1 can automatically extract text, symbols, and graphics from social media services triggered by a mention of certain names, a social media viewing history, and an assessment of trending topics. The external computer 1 can automatically provision and assign new labels (e.g., Twitter® hashtags) and apply them to social media services that it extracts.

The external computer 1 can connect to an online marketplace where a user can upload text, symbols, or images suitable for display on the device. At the online marketplace, the user can use the external computer 1 to purchase text, symbols, or images suitable for permanent or temporary display on the device. At the online marketplace, the user may choose to rent rather than purchase text, symbols, or images suitable for display on the device and such text, symbols, or images will be accompanied by an automatic deletion trigger that instructs the device to delete such text, symbols, or images after a certain date or after being displayed a certain number of times.

In a specific implementation, using the external computer 1, a user is able to assign probabilities of occurrence to each set of characters or symbols to be transmitted to the device. The software on or accessed by the external computer 1 can ensure that the sum of the probabilities selected total one hundred percent. The user may also assign certain sets of characters and sounds to play when the device senses a particular temperature range, barometric pressure range, or the electrical properties of the skin of the person holding the device. The device may automatically assign an equal probability of occurrence to each set of characters or symbols. The device may also interpret the meaning of each set of characters or symbols to be displayed and determine in which contexts it should be displayed.

In a specific implementation, using the external computer 1, a user is able to upload or select a series of sounds to be played when the device is shaken. The user can choose these sounds from a list contained within the software contained within or accessed by the external computer 1, or the user may upload sounds to the memory 8. The software can automatically screen any uploaded sounds to ensure that they are of the proper duration and format to be played by the device.

In a specific implementation, a person activates the device by shaking it, which moves the object in the shaker 13 and develops electric power through the energy harvester 11 or an external method of charging the energy storage 12. The electricity developed in the energy harvester 11 can be stored in the energy storage 12 and trickled into the CPU 7. The CPU 7 can load an operating program from the memory 8. The CPU 7 can instruct the input/output module 9 to listen for a signal from the external computer 1. The CPU 7 can communicate via the CPU interface bus 16 to interface with the skin sensor 14, temperature and barometric pressure sensor 3, motion sensor 10, GPS 5, speaker 4, memory 8, display and driver 6, input/output 9, and orientation sensor 17.

In a specific implementation, the external computer 1 transmits a unique code that matches a code in the device's memory 8 in order for the external computer 1 to be recognized by the device. If the device recognizes the external computer 1, then the device will transmit a signal of recognition (a handshake) through the input/output 9 back to the external computer 1.

In a specific implementation, if the external computer 1 is recognized by the device with a handshake, the external computer 1 transmits and the device receives sets of characters and symbols, each of which may have a probability of occurrence assigned, and sounds or symbols representing a particular sound, and stores them in the memory 8. For sound files stored in the memory 8, the external computer 1 can only transmit a code selecting a particular sound file, rather than transmit a new sound file to the device.

In a specific implementation, a user activates the device by shaking it, which moves the object in the shaker 13 and develops electric power through the energy harvester 11. The electricity developed in the energy harvester 11 can be stored in the energy storage 12 and trickled into the CPU 7. The CPU 7 can load an operating program from the memory 8. The operating program can cause the CPU 7 to select a discrete set of characters and symbols to be displayed on the display 6, which is visible to users through the lens 2. The selection of which set of characters and symbols to be displayed is driven by the probabilities downloaded from the external computer 1 or through application of a random number generator program. The power from the energy storage 12 can be transmitted via the power bus 15 to the display backlight 22, CPU 7, CPU interface bus 16, skin sensor 14, temperature and barometric pressure sensor 3, motion sensor 10, GPS 5, speaker 4, memory 8, display and driver 6, input/output 9, and orientation sensor 17.

In a specific implementation, the device can show certain phrases or play certain sounds based on the proximity of the device to certain GPS coordinates, as measured by the GPS 5 or GPS data from the External computer 1 to which it connects. The device can show certain phrases or play certain sounds based on the temperature or barometric pressure, as measured by the temperature and barometric pressure sensor 3. Further, the device can show certain phrases or play certain sounds based on the electrical properties of the skin of the person holding the device, as measured by the skin sensor 14.

In a specific implementation, the orientation sensor 17 is used to determine whether new text or symbols should be displayed when the device is moved. If the orientation of the device (e.g., turning it upside down) changes, then the device can display new text or symbols on the display 6.

In a specific implementation, the lens 2 is colored to give the appearance that the device is full of colored liquid. The CPU 7 can use the display backlight 22 to enable the text/phrase/symbols/graphics to gradually fade into and out of the display with a user-selected color, where such fade makes it appear that there is a die encased in a liquid chamber in the device.

In a specific implementation, the device uses the GPS sensor 5, temperature and barometric pressure sensor 3, electrical properties of the skin of users 14, a date and time when it is shaken and the set of characters and symbols displayed and sounds played. This information is stored in the memory 8 and can be communicated to the external computer 1 through the input/output module 9.

Figure 7A:
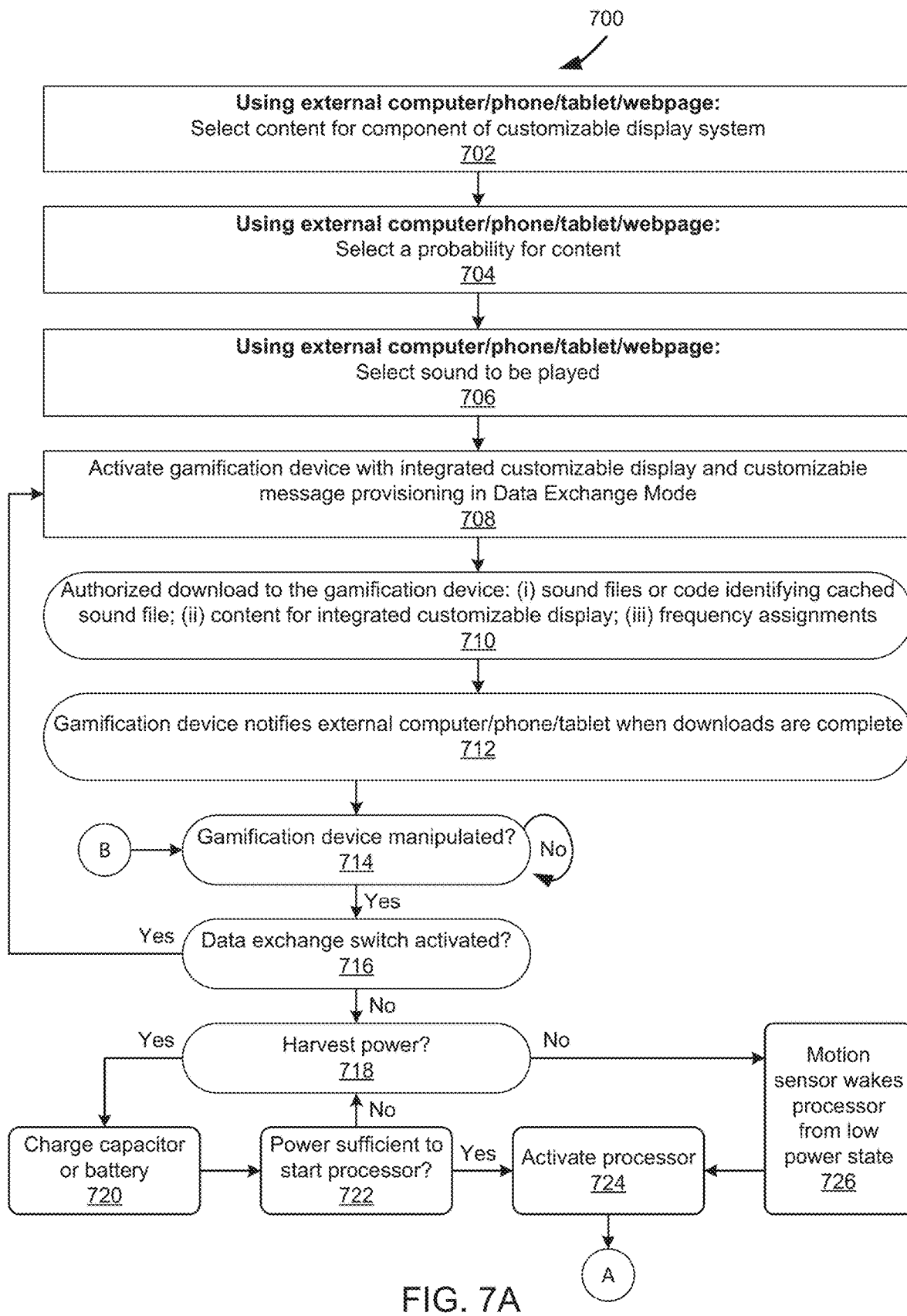
FIGS. 7A and 7B depict a diagram of a flowchart of an example operation of a gamification device with an integrated customizable display system and a customizable message provisioning system.
Figure 7B:
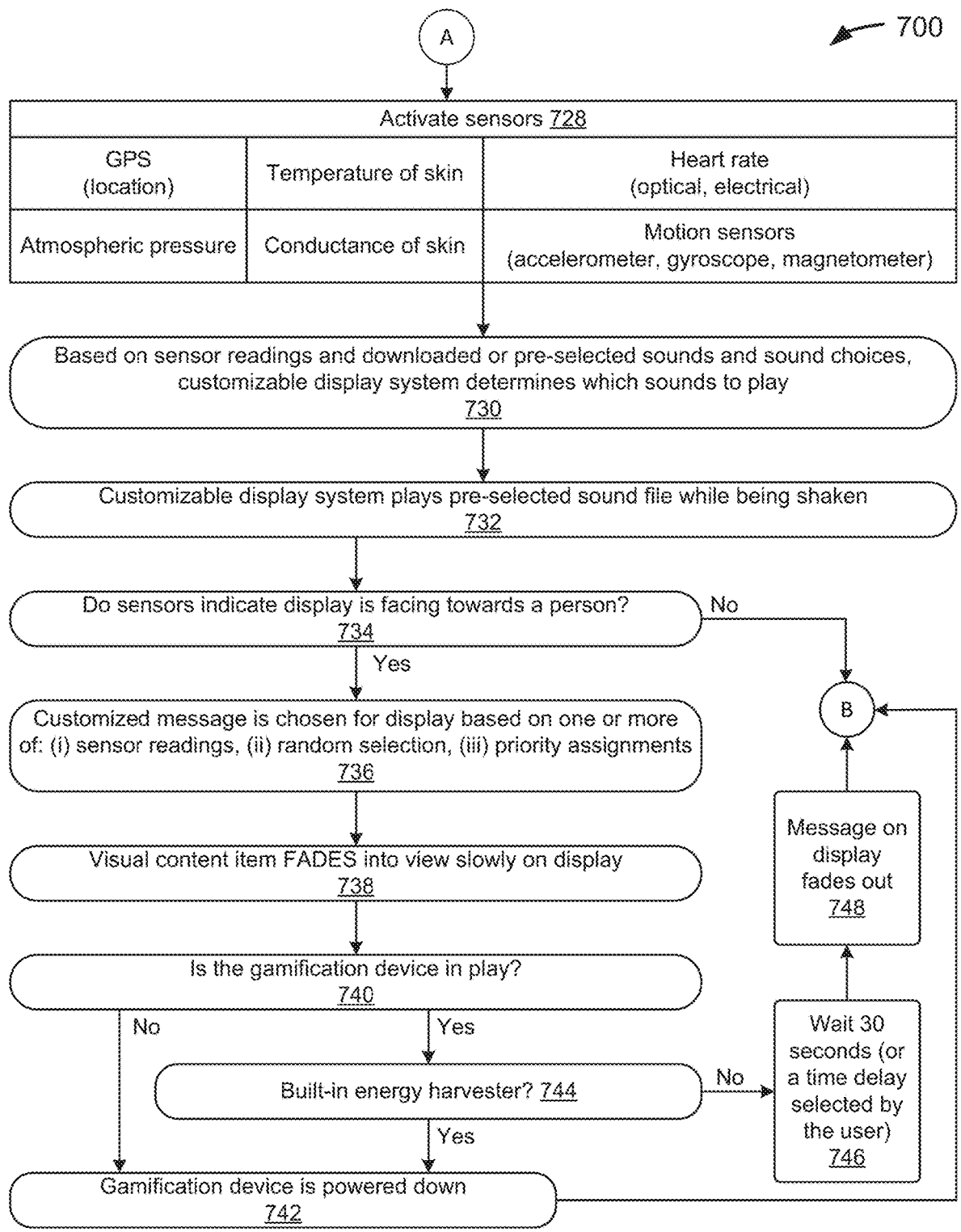

FIGS. 7A and 7B depict a diagram of a flowchart 700 of an example operation of a gamification device with an integrated customizable display and a customizable message provisioning system. The flowchart begins at module 702, where a person using an external computer, phone, tablet, webpage, or the like (or artificial agent of a person) selects, types, or otherwise provides content, such as phrases, numbers, symbols, or the like for a component of a customizable display system, such as a magic ball internal die. An applicable engine for managing content to be integrated into a customizable display system, such as the content gathering engines described in this paper, can receive user input regarding a selection or a providing of content to be reproduced at a customizable display.

The flowchart 700 continues to module 704, where the person using the external computer, phone, tablet, webpage, or the like (or artificial agent of a person) selects a probability for a phrase, number, symbol, or other content that was selected for the gamification device with an integrated customizable display and a customizable message provisioning system (e.g., a magic ball internal die). An applicable engine for managing content to be integrated into a customizable display system, such as the content gathering engines described in this paper, can receive user input regarding probabilities content will be provided in use. The module 704 is optional because probabilities may or may not be received from person (or artificial agent of a person), and could be predetermined, assigned in accordance with a function, or otherwise selected or assigned without user input.

The flowchart 700 continues to module 706, where a person using the external computer, phone, tablet, webpage, or the like (or artificial agent of a person) selects or uploads sounds to be played, e.g., when the gamification device with an integrated customizable display and a customizable message provisioning system is in upload mode and shaken. An applicable engine for managing content to be reproduced at a customizable display system, such as the content gathering engines described in this paper, can receive user input regarding a selection or content data of sounds to be reproduced at the customizable display system reproducing content. Depending upon implementation- or configuration-specific parameters, sound can be pre-cached on the gamification device with an integrated customizable display and a customizable message provisioning system or downloaded to the gamification device with an integrated customizable display and a customizable message provisioning system. For example, content data used to reproduce a sound can be pre-loaded on the gamification device or sent to the gamification device. In a specific implementation, the sound file is limited to a certain size, length, and quality. The module 706 is optional because sounds may or may not be selected by a person, and could be predetermined, assigned in accordance with a function, or otherwise selected or assigned without user input.

The flowchart 700 continues to module 708, where the gamification device with an integrated customizable display and a customizable message provisioning system is activated in a data exchange mode. Activation in the data exchange mode can be by shaking the device, activating a dedicated data exchange mode switch, or in some other applicable manner.

The flowchart 700 continues to module 710, where authorized download to the gamification device with an integrated customizable display and a customizable message provisioning system occurs. In a specific implementation, authorized download means authentication information is exchanged between the external computer, phone, tablet, webpage, or the like and the gamification device with an integrated customizable display and a customizable message provisioning system to ensure downloaded content is authorized by an appropriate party. After authentication of the gamification device, content data is received from the external device at the gamification device and made available to the customizable display, such as the customized content reproduction management systems described in this paper. Content data can be sent to the gamification device by an external device over either a wired or wireless connection. The content data can include sound files or code identifying sound files cached on the gamification device, content for an integrated customizable display, and/or frequency assignments for content.

The flowchart 700 continues to module 712, where the gamification device notifies the external device when it has completed downloading the content data. An applicable system for managing content capable of being reproduced at the customizable display system, such as the customized content maintenance systems described in this paper, can notify an external device when it has completed downloading the content data.

The flowchart 700 continues to module 714, where it is determined if the gamification device is being manipulated. For example, it can be determined whether a person is shaking, tapping, tossing, or otherwise moving the gamification device. Whether a person is physically manipulating the gamification device can be determined based on received interaction data by an applicable system for determining whether the person is physically manipulating the gamification device, such as the customized content reproduction management systems described in this paper. It may be noted that certain movements of a device may not be treated as "manipulation" for the purpose of determining whether the gamification device is activated, switches to a different mode of operation, or the like. For example, if a gamification device is being carried around in a backpack, detecting movement might not be adequate to activate the device, while if the gamification device is being carried in hand, it might.

If it is determined the gamification device is being manipulated (714—Yes), then the flowchart 700 continues to module 716, where it is determined if a data exchange switch is activated. An applicable system for managing content capable of being reproduced at the customizable display system, such as the customized content maintenance systems described in this paper, can determine if a data exchange switch is activated. In an alternative, the data exchange switch can be replaced with (or redundant with) a particular type of manipulation (e.g., the gamification device could listen for a keyword to activate data exchange mode, wait for the gamification device to be tapped on a hard surface three times in a succession, or the like).

If it is determined that the data exchange switch is activated, then the flowchart 700 returns to module 708 and continues as described previously. If it is determined the data exchange switch is not activated (716—No), then the flowchart 700 optionally continues to module 718, where it is determined whether to harvest power. In a specific implementation that does not include a battery, a mechanical shaker is implanted within the gamification device. A mechanical shaker can also be used with a battery and acts as a battery alternative (e.g., when the battery is exhausted) or as a recharging component for a rechargeable battery.

If it is determined power is to be harvested (718—Yes), then the flowchart 700 continues to module 720, where the gamification device charges a capacitor or battery. In a specific implementation, the harvesting of power entails utilizing a mechanical shaker. In harvesting electrical power, either or both capacitors and batteries are charged. The flowchart 700 continues to module 722, where it is determined whether enough electrical power is collected to power a processor. If not (722—No), then the flowchart 700 returns to module 718 and continues as described previously. If, on the other hand, there is sufficiently power to start a processor (722—Yes), then the flowchart 700 continues to module 724, where a processor of the gamification device is powered on. Alternatively, if it is determined not to harvest power (718—No), then the flowchart 700 continues to modules 726 where a motion sensor wakes the processor from a low power state and the flowchart returns to module 724 as described previously. Instead or in addition, the processor can be awakened through some other mechanism, such as a button. A processor of the gamification device can operate at a low power state using electrical power supplied by a user-provided or removable battery.

The flowchart 700 continues from module 724 to module 728, where sensors of the gamification device are activated. For example, environmental sensors such as GPS, atmospheric pressure sensors, motion sensors, or the like. of the gamification device can be activated. Also, personal state sensors can be activated, such as sensors to detect temperature of contacting skin, heart rate (optical or electrical), conductance of contacting skin, or the like.

The flowchart 700 continues to module 730, where based on readings from the sensors, e.g. as indicated by environmental conditions data or interaction data, sounds are played by the customizable display system. The sounds, which can include music, are downloaded or preselected sounds or sound choices (e.g., for sounds that are already on the gamification device). Sounds can be played by the customizable display system using content data based on content presentation rules and the readings from the sensors. An applicable engine for managing reproduction of content by the gamification device, such as the content reproduction direction engines described in this paper, can manage playing of sounds at the customizable display system based on readings from the sensors.

The flowchart 700 continues to module 732, where the customizable display system reproduces a pre-selected sound while the gamification device is being shaken. The pre-selected sounds can come from a randomized or rotating list of sounds in an implementation in which the sound may be different at different times. An applicable engine for managing reproduction of content by the customizable display system, such as the content reproduction direction engines described in this paper, can manage reproduction of a pre-selected sound while the gamification device is being shaken.

The flowchart 700 continues to module 734, where it is determined if the sensors of the customizable display system indicate that the customizable display system is facing forward towards the user. An applicable system for managing content reproduction at the customizable display system, such as the customized content reproduction management systems described in this paper, can determine if the customizable display system is facing forwards towards the user. Whether the customizable display system is facing forwards towards the user can be determined based on interaction data received from sensors.

If it is determined a display of the customizable display system is not facing towards a person (734—No), then the flowchart 700 returns to module 714 and continues as described previously. If, on the other hand, it is determined the customizable display system is not facing towards a person (734—Yes), then the flowchart 700 continues to module 736, where a customized message is chosen for display. The customized message can be chosen using one or more of sensor readings, random selection, or priority assignments (e.g., ordered, weighted probability, or the like). In a specific implementation, customized messages are chosen from a list of content items. The content items can be visual (e.g., written phrases, numbers, symbols, or the like), audible (e.g., spoken phrases, music, sounds, or the like), tactile (e.g., vibration, warmth, electrical shock, or the like), or a combination of these. An applicable engine for managing content reproduction at the customizable display system, such as the content reproduction direction engines described in this paper, can choose a customize message from a list of content items to reproduce at the customizable display system.

The flowchart 700 continues to module 738, where the customized message is displayed at the customizable display system by fading the message into view. Alternatively or in addition, the customized message can be conveyed via audible or tactile stimuli. It may be noted that slowly fading into view is an aesthetic, which could be replaced with some other display aesthetic, such as flying into view, expanding into view, or the like, and at a speed that varies by implementation and preference. The customized message can be displayed at the customizable display system using content data in response to a presentation instruction.

The flowchart 700 continues to module 740, where it is determined if the customizable display system is in play. In a specific implementation, whether a gamification device is in play depends upon whether a display is facing a person; if it can be determined a display is facing a person the gamification device is in play and, if not, the gamification device is not in play. It may be noted that messages need not always be visual, so it may be desirable to instead or in addition determine whether a person is within earshot of the gamification device. Instead or in addition, the gamification device may use some other combination of gamification rules and sensor readings to determine whether the gamification device is "in play," such as by starting a timer that continues to count down until the gamification device is manipulated and, if the timer is expended, the device is treated as no longer in play. An applicable system for managing content reproduction at the customizable display system, such as the customized content reproduction management systems described in this paper, can determine if the customizable display system is facing towards the user.

If it is determined that the gamification device is not in play (740—No), then the flowchart 700 continues to module 742, where the gamification device is powered down. Powering down can include turning completely off, entering a sleep mode, entering low power mode, or some other not-quite-off mode. The gamification device can also step down from not-quite-off modes over time until it shuts down. If, on the other hand, it is determined that the gamification device is in play (740—Yes), then the flowchart 700 continues to module 744, where it is determined if the gamification device includes a built-in energy harvester. For example, the gamification device could include a mechanical shaker and capacitor that can build up charge by activating the mechanical shaker. If it is determined that the gamification device includes a built-in energy harvester (744—Yes), then the flowchart 700 returns to module 742 where the gamification device is powered down. After module 742, the flowchart 700 returns to module 714, where the flowchart 700 continues as described previously.

If, on the other hand, it is determined that the gamification device does not include a built-in energy harvester (744—No), then the flowchart 700 continues to modules 746 and then to 748, where a specific amount of time is let to pass, e.g. thirty seconds, and the customized message displayed on the customizable display system fades until it is no longer displayed. Then the flowchart 700 returns to module 714 and continues as described previously.

Figure 8:
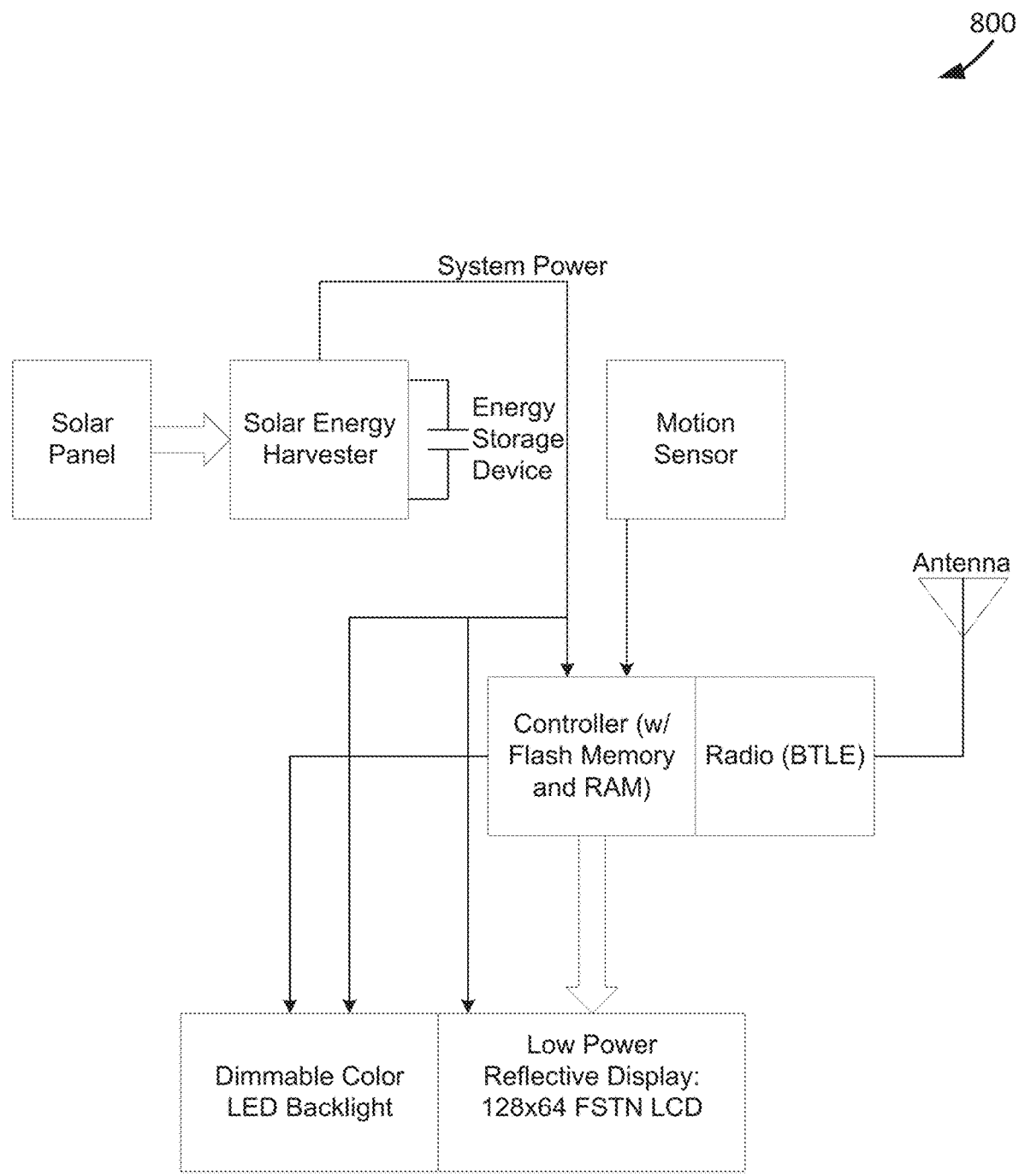
FIG. 8 depicts a diagram of a solar powered customizable display system integrated with a gamification device.

FIG. 8 depicts a diagram 800 of a solar powered customizable display system integrated with a gamification device.

Figure 9:
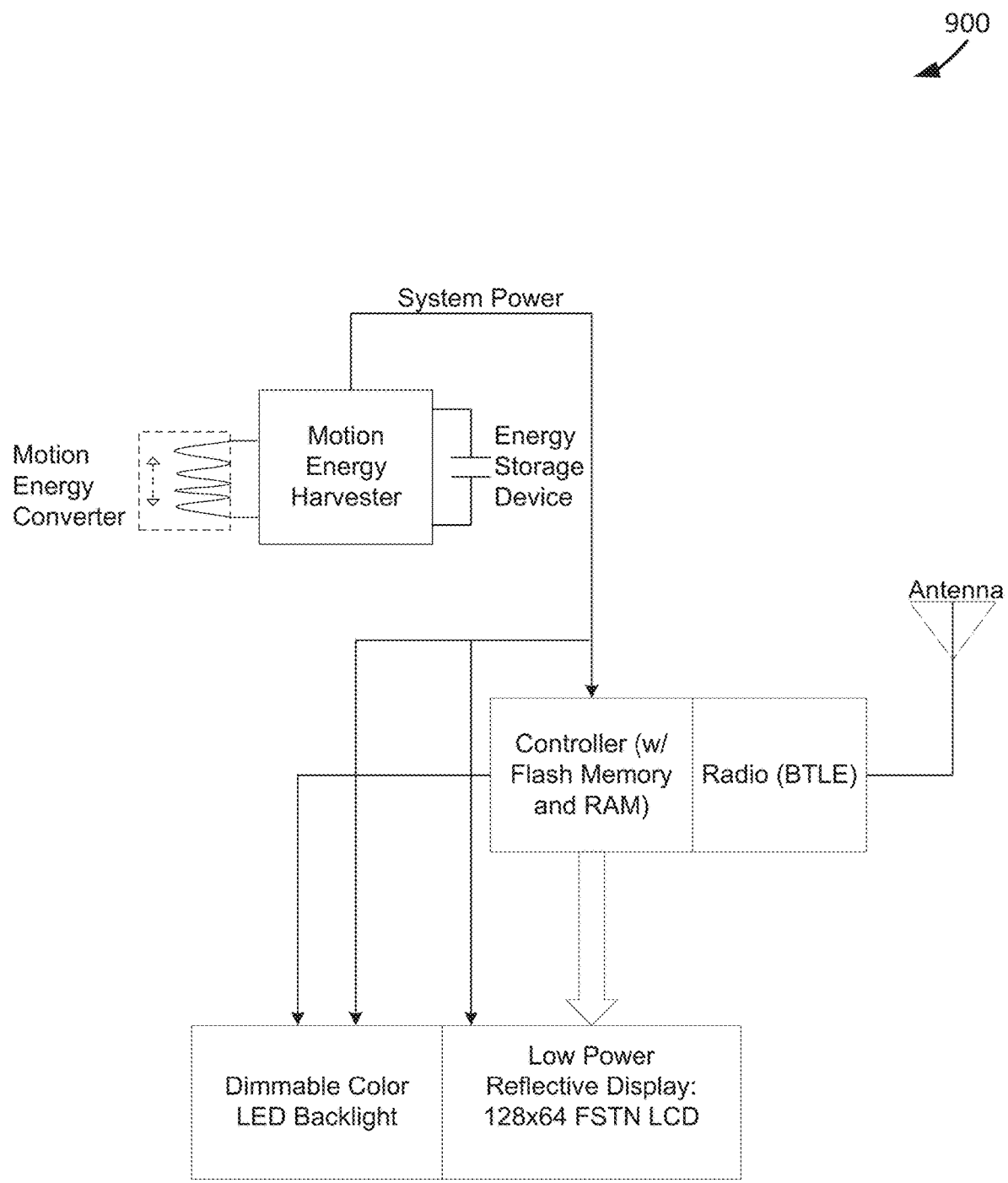
FIG. 9 depicts a diagram of a movement activated self-powering customizable display system integrated with a gamification device.

FIG. 9 depicts a diagram 900 of a movement activated self-powering customizable display system integrated with a gamification device.

Figure 10:
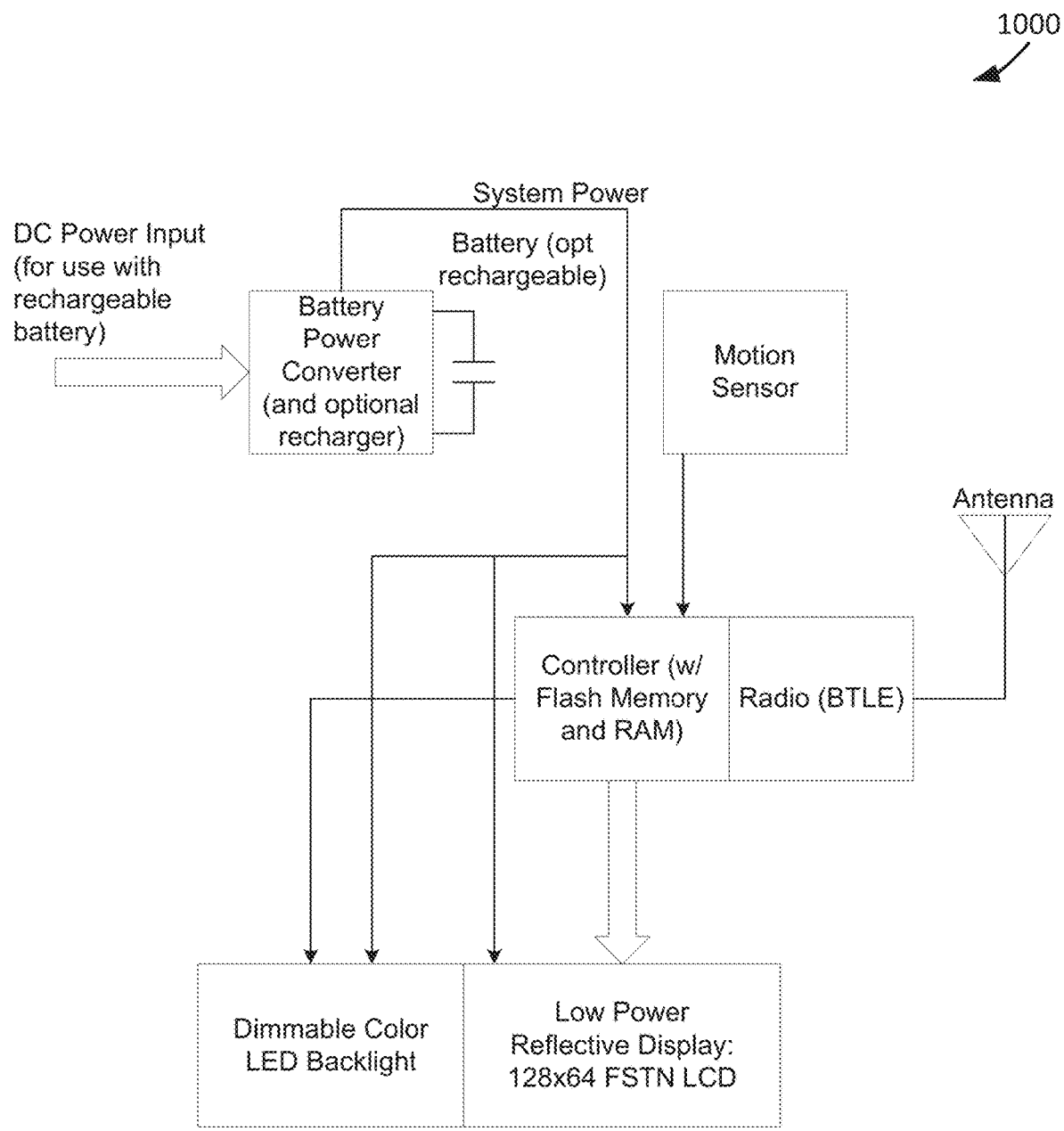
FIG. 10 depicts a diagram of a battery powered customizable display system integrated with a gamification device.

FIG. 10 depicts a diagram 1000 of a battery powered customizable display system integrated with a gamification device.

Figure 11:
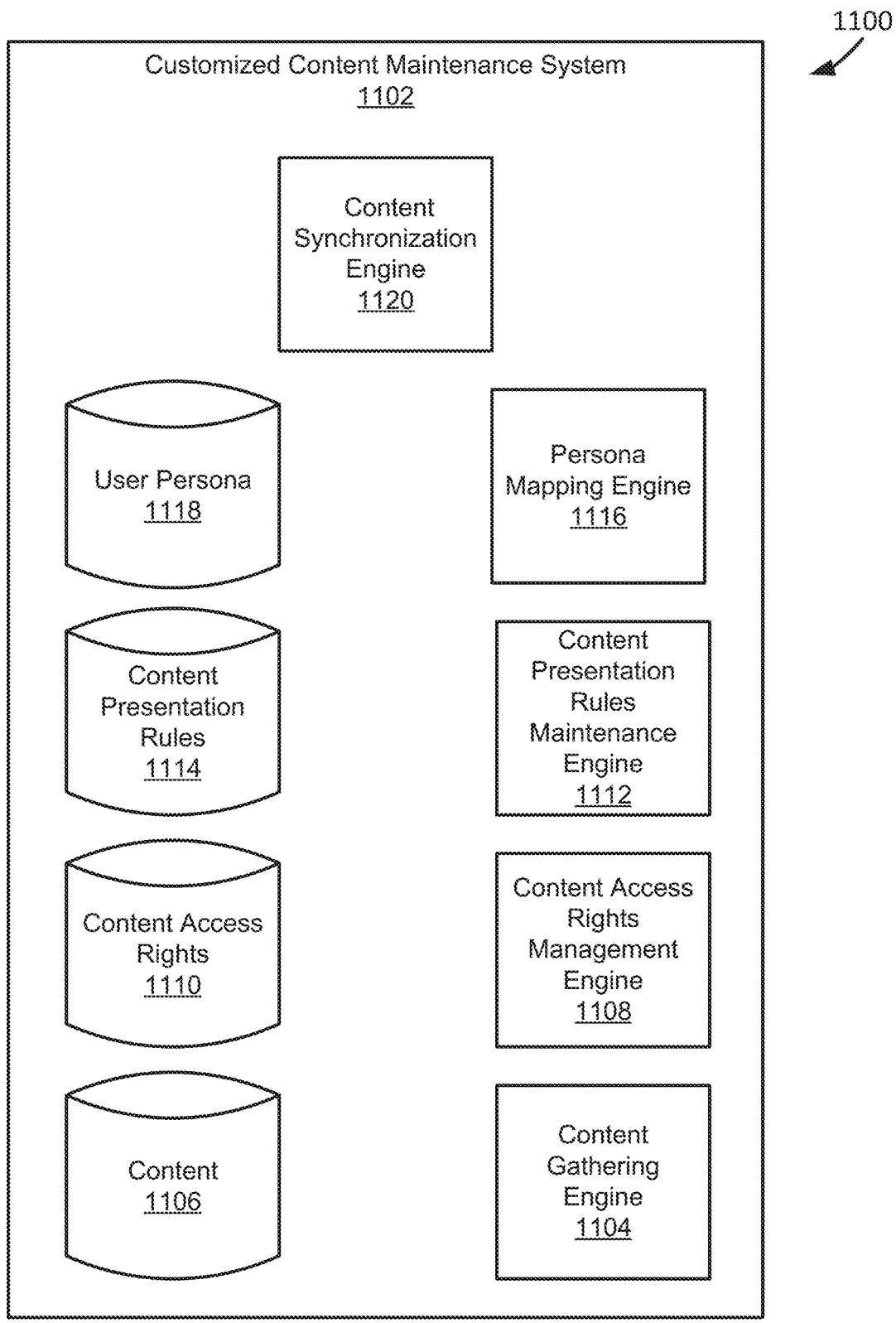
FIG. 11 depicts a diagram of a customized content maintenance system.

FIG. 11 depicts a diagram 1100 of a customized content maintenance system 1102. The customized content maintenance system 1102 functions to maintain content and associated rules for presenting such content on a customizable display system. All or portions of the customized content maintenance system 1102 can be integrated as part of an applicable system for managing reproduction of content through a customizable display system, such as the customizable message provisioning systems described in this paper. The customized content maintenance system 1102 can maintain content data for use in reproducing content for a user through a customizable display system. Additionally, the customized content maintenance system 1102 can maintain content rules for use in determining when and how to reproduce content for a user through a customizable display system.

The example customized content maintenance system 1102 shown in FIG. 11 includes a content gathering engine 1104, a content datastore 1106, a content access rights management engine 1108, a content access rights datastore 1110, a content presentation rules maintenance engine 1112, a content presentation rules datastore 1114, a persona mapping engine 1116, a user persona datastore 1118, and a content synchronization engine 1120. The content gathering engine 1104 functions to gather content for reproduction to a user through a customizable display system. Content gathered by the content gathering engine 1104 can include customized messages, indicia, or sounds. For example, the content gathering engine 1104 can generate a list of customized messages capable of being displayed on a customizable display system. In gathering content for reproduction to a user through a customizable display system, the content gathering engine 1104 can maintain content data. For example, the content gathering engine 1104 can generate content data used to reproduce a message or indicia at a customizable display system.

In a specific implementation, the content gathering engine 1104 functions to gather content based on input from users. For example, a primary user can provide to the content gathering engine 1104 a list of messages to display on a customizable display system, and the content gathering engine 1104 can generate content data including the list of messages, for use in reproducing the messages at the customizable display system. In utilizing users to gather content, the content gathering engine 1104 can function to crowd source the generation of content for reproduction by a customizable display system. For example, the content gathering engine 1104 can gather messages to display from a plurality of users and subsequently create a list of the messages for potential display on a customizable display system.

In a specific implementation, the content gathering engine 1104 functions to gather content from external sources. External sources can include sources related to a user or unrelated to a user. For example, external sources can include a social media profile of a user. In another example, external sources can include a search engine. In using a search engine to gather content, the content gathering engine 1104 can determine from the search engine trending search terms and generate content to include the trending search terms.

In a specific implementation, the content gathering engine 1104 functions to modify gathered content for reproduction by a customizable display system. In modifying gathered content, the content gathering engine 1104 can limit or modify indicia or script according to either or both the size of the indicia or script or a size of a face that will include the indicia or script. For example, the content gathering engine 1104 can remove words from a message input by a user to ensure that the message can fit on a display. Additionally, in modifying gathered content, the content gathering engine 1104 can remove indicia or words from gathered content. For example, the content gathering engine 1104 can remove offensive language from gathered content.

In a specific implementation, the content gathering engine 1104 functions to gather content from an applicable source for managing advertising, promotion, or giving away of products or services. For example, the content gathering engine 1104 can gather content data of a digital marketing firm managing advertisements for an entity providing goods or services. In another example, the content gathering engine 1104 can gather content indicating an offered promotion for a good or service, from an entity offering the good or service.

The content datastore 1106 functions to store content data. Content data stored in the content datastore 1106 can be maintained by an applicable engine for gathering content to be displayed at a customizable display system, such as the content gathering engines described in this paper. Additionally, content data stored in the content datastore 1106 can be provided to a customizable display system can be provided to the customizable display system for use in reproducing content for users, e.g. in response to presentation instructions. Further, content data stored in the content datastore 1106 can be associated with user personas. Specifically, content data can be associated with either or both specific user personas and specific users who have been mapped to user personas. For example content data can indicate specific content should be reproduced for users who live within a certain region.

The content access rights management engine 1108 functions to manage access rights to content capable of being reproduced through a customizable display system. In managing access rights to content, the content access rights management engine 1108 can generate or update content access rights data to indicate specific content a user has a right to perceive. For example, if a user has gained the right to have a list of messages displayed at a customizable display system utilized by the user, then the content access rights management engine 1108 can update content access rights data to indicate the user has a right to have the messages within the list displayed at the customizable display system.

In a specific implementation, the content access rights management engine 1108 functions to grant access rights to content capable of being reproduced through a customizable display system. In granting access rights to content, the content access rights management engine 1108 can sell the access rights to a user. For example, the content access rights management engine 1108 can sell to a user a right to have messages within a list of messages displayed at a customizable display system owned or otherwise operated by the user. Further, in granting access right to content, the content access rights management engine 1108 can reward the access rights to a user. For example, the content access rights management engine 1108 can reward to a user a right to have messages within a list of messages displayed at a customizable display system owned or otherwise operate by the user.

The content access rights datastore 1110 functions to store content access rights data. Content access rights data indicates users access rights to content capable of being reproduced through a customizable display system. For example, content access rights data can be updated to indicate a user has a right to reproduce specific content through a customizable display system owned or operated by a user. Content access rights data stored in the content access rights datastore 1110 can be maintained by an applicable engine for managing access rights to content capable of being reproduced through a customizable display system, such as the content access rights management engines described in this paper.

The content presentation rules maintenance engine 1112 functions to maintain content presentation rules for controlling reproduction of content through a customizable display system. In maintaining content presentation rules, the content presentation rules maintenance engine 1112 can generate or update content presentation rules data indicating content presentation rules. The content presentation rules maintenance engine 1112 can maintain content presentation rules absent input from a user or a controlling authority. For example, the content presentation rules maintenance engine 1112 can set a pseudo-random display order, as included as part of content presentation rules, for a display order in a list of messages.

In a specific implementation, the content presentation rules maintenance engine 1112 functions to maintain content presentation rules according to input received from a user. For example a user can provide to the content presentation rules maintenance engine 1112 specify a display order for messages in a provided list of customized messages capable of being displayed at a customizable display system. Further in the example, the content presentation rules maintenance engine 1112 can generate content presentation rules for the list of customized messages specifying to display the messages in the display order specified by the user.

In a specific implementation, the content presentation rules maintenance engine 1112 functions to maintain content presentation rules according to input received from an applicable source for managing advertising, promotion, or giving away of products or services. For example, the content presentation rules maintenance engine 1112 can generate content presentation rules specifying to present an advertisement of a product through a customizable display system at least once a day. In another example, the content presentation rules maintenance engine 1112 can generate content presentation rules specifying to give away a product to a user of a plurality of users within a specific region only once a day, e.g. by notifying the user utilizing a customizable display system.

In a specific implementation, the content presentation rules maintenance engine 1112 functions to associate content presentation rules with user personas. In associating content presentation rules with user personas, the content presentation rules maintenance engine 1112 can specify which content presentation rules to use for specific personas of users of a customizable display system. For example, if a user persona indicates a user lives within a specific region, then the content presentation rules maintenance engine 1112 can specify using content presentation rules for displaying advertisements of restaurants within the specific region to the user. In another example, if a user persona indicates a user is a male between the ages of twenty and twenty-five, can specify using content presentation rules that lead to display of advertisements at a faster rate than a normal rate.

The content presentation rules datastore 1114 functions to store content presentation rules data. Content presentation rules data stored in the content presentation rules datastore 1114 specifies content presentation rules used in controlling the reproduction of content at a customizable display system. Content presentation rules data stored in the content presentation rules datastore 1114 can be maintained by an applicable engine for maintaining content presentation rules used in controlling the reproduction of content at a customizable display system, such as the content presentation rules maintenance engines described in this paper. Content presentation rules data stored in the content presentation rules datastore 1114 can specify content presentation rules associated with a user persona. For example, content presentation rules indicated by data stored in the content presentation rules datastore 1114 can specify rules to use in reproducing content on a customizable display system to a user within a specific age range.

The persona mapping engine 1116 functions to map a user of a customizable display system to a persona. In mapping a user to a persona, the persona mapping engine 1116 can use information gathered from a customizable display system or a gamification device implementing the customizable display system. For example, if a user in utilizing a customizable display system or a gamification implementing the customizable display system is within a specific region, then the persona mapping engine 1116 can map the user to a persona defined to include people within the specific region. Additionally, in mapping a user to a persona, the persona mapping engine 1116 can use information gathered from an applicable information system, e.g. a social network of a user. For example, if a social network of a user indicates a user likes a music band popular within a specific age group of people, then the persona mapping engine 1116 can map the user to a persona defined to include people within the specific age group.

The user persona datastore 1118 functions to store user persona data. User persona data indicates specific users and personas to which they have been matched. User persona data stored in the user persona datastore 1118 can indicate a plurality of personas to which a user has been mapped. User persona data stored in the user persona datastore 1118 can be maintained by an applicable system for mapping users to personas for purposes of a managing reproduction of content to the users at a customizable display system, such as the persona mapping engines described in this paper.

The content synchronization engine 1120 functions to synchronize one or an applicable combination of content data, content access rights data, and content presentation rules data with an applicable external device. An example external device can include an applicable client device, e.g. a smartphone, or another gamification device integrated with a customizable display system. In synchronizing an applicable external device, the content synchronization engine 1120 can pair, using a wireless connection, the applicable external device with a gamification device integrated with a customizable display system. Additionally, in synchronizing with an applicable external device, the content synchronization engine 1120 can receive one or an applicable combination of content data, content access rights data, and content presentation rules data from an applicable external device. For example, the content synchronization engine 1120 can be used to wirelessly receive content data from another gamification device integrated with a customizable display. Additionally, in synchronization with an applicable external device, the content synchronization engine 1120 can send one or an applicable combination of content data, content access rights data, and content presentation rules data to an applicable external device. For example, the content synchronization engine 1120 can be used to wirelessly transmit content data to another gamification device integrated with a customizable display.

In an example of operation of the example customized content maintenance system 1102 shown in FIG. 11, the content gathering engine 1104 gathers content that can be reproduced at a customizable display system integrated as part of a gamification device. In the example of operation of the example system shown in FIG. 11, the content datastore 1106 stores content data indicating the content gathered by the content gathering engine 1104. Additionally, in the example of operation of the example system shown in FIG. 11, the content access rights management engine 1108 maintains access rights for users of the customizable display system to have the content reproduced through the customizable display system. In the example, operation of the example system shown in FIG. 11, the content access rights datastore 1110 stores contents access rights data indicating the access rights for the users of the customizable display system. Further, in the example of operation of the example system shown in FIG. 11, the content presentation rules maintenance engine 1112 maintains content presentation rules, as indicated by content presentation rules data stored in the content presentation rules datastore 1114, for use in controlling reproduction of content at the customizable display system.

Figure 12:
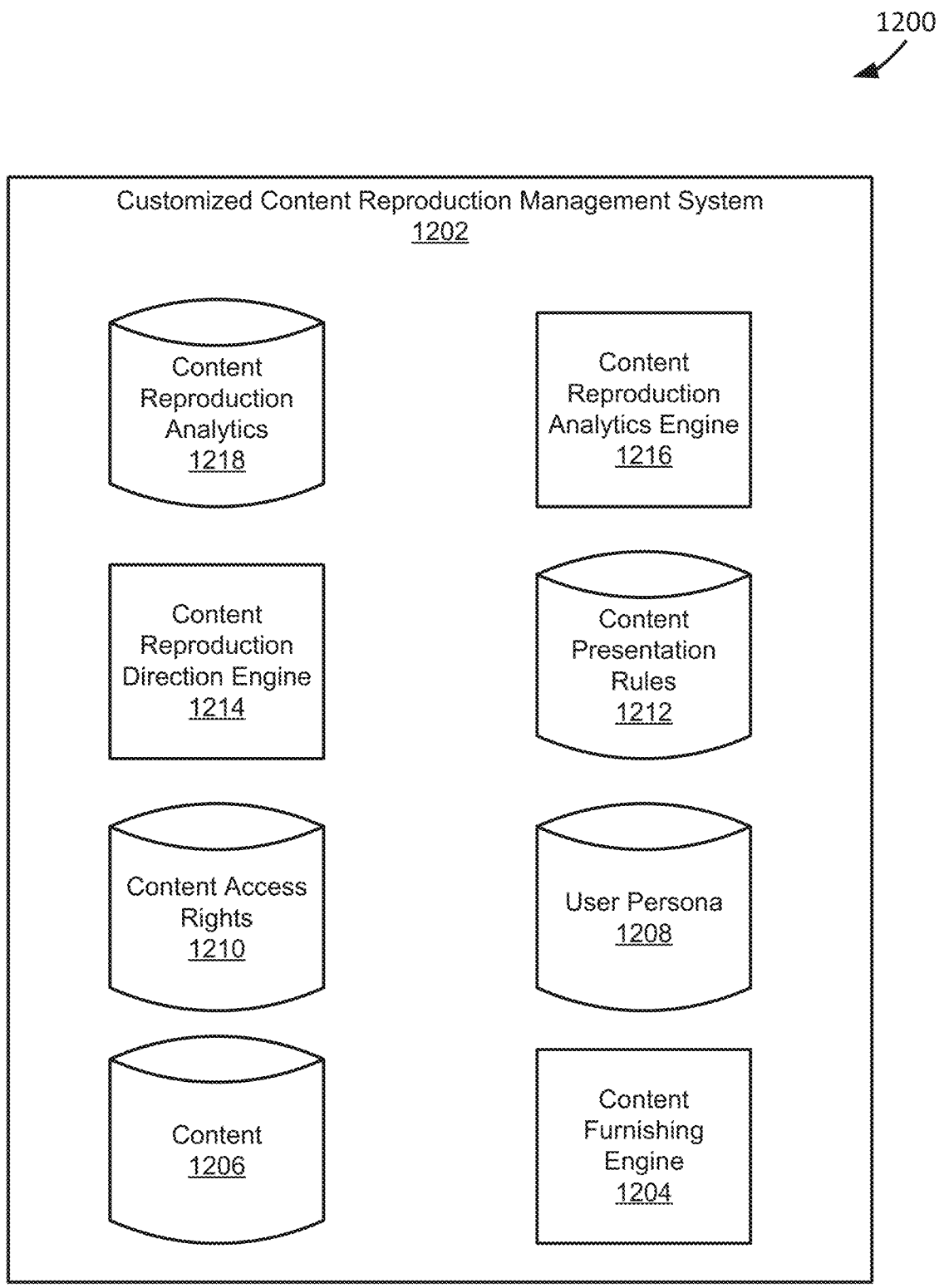
FIG. 12 depicts a diagram of an example of a customized content reproduction management system.

FIG. 12 depicts a diagram 1200 of an example of a customized content reproduction management system 1202. The customized content reproduction management system 1202 functions to manage reproduction of content through a customizable display system. All or portions of the customized content reproduction management system 1202 can be integrated as part of an applicable system for managing reproduction of content through a customizable display system, such as the customizable message provisioning systems described in this paper. In managing reproduction of content through a customizable display system, the customized content reproduction management system 1202 can send content data to the customizable display system for use by the display system in reproducing content, e.g. customized messages or indicia. Additionally, in managing reproduction of content through a customizable display system, the customized content reproduction management system 1202 can instruct a customizable display system to reproduce content by sending presentation instructions to the display system.

In a specific implementation, the customized content reproduction management system 1202 functions to receive either or both interaction data and environmental conditions data. The customized content reproduction management system 1202 can used either or both received interaction data and environmental conditions data to control reproduction of content at a customizable display system. For example, if received interaction data indicates a user has changed orientation of a customizable display system or a gamification device integrated with a customizable display system and content presentation rules dictate displaying a new message from a list of messages when the orientation of the customizable display system or the gamification device is changed by a user, then the customized content reproduction management system 1202 can cause the display system to reproduce the new message.

The example customized content reproduction management system 1202 shown in FIG. 12 includes a content furnishing engine 1204, a content datastore 1206, a user persona datastore 1208, a content access rights datastore 1210, a content presentation rules datastore 1212, a content reproduction direction engine 1214, a content reproduction analytics engine 1216, and a content reproduction analytics datastore 1218. The content furnishing engine 1204 functions to provide content data to a customizable display system. Content data provided by the content furnishing engine 1204 to the customizable display system is used by the customizable display system to reproduce the content at the customizable display system. All content data provided by the content furnishing engine 1204 to a customizable display system does not necessarily have to be used by the customizable display system in reproducing content. For example, the content furnishing engine 1204 can provide to a customizable display system content data for use in reproducing a plurality of customized messages within a list, while the customizable display system might only reproduce a subset of the plurality of customized messages within the list.

In a specific implementation, the content furnishing engine 1204 functions to selectively provide content data to a customizable display system. In selectively providing content data to a customizable display system, the content furnishing engine 1204 can select specific content data to provide to a customizable display system, and subsequently provide the selected specific content data to the customizable display system. The content furnishing engine 1204 can selectively provide content data to a customizable display system based on user input. For example a user of a customizable display system can specify they want to display customized messages, e.g. messages made by the user, in a list at the customizable display system, and the content furnishing engine 1204 can provide content data used to reproduce the customized messages to the customizable display system. Additionally, the content furnishing engine 1204 can select content to provide to a customizable display system based on a persona to which a user associated with the customizable display system has been mapped. For example, if specific content is associated with males between the ages of twenty and twenty-five and a user of a customizable display system is a male between the ages of twenty and twenty-five, then the content furnishing engine can select and subsequently provide the specific content to the customizable display system.

In a specific implementation, the content furnishing engine 1204 functions to select content to provide to a customizable display system based on content access rights. The content furnishing engine 1204 can select content data to provide to a customizable display system based on whether a user associated with the customizable display system has access rights to the content represented by the content data. For example, if a user has access rights to content, then the content furnishing engine 1204 can provide content data used in reproducing the content to a customizable display system. The content furnishing engine 1204 can provide content data to a customizable display system as soon as a user associated with the customizable display system gains access rights to content indicated by the content data. Alternatively, the content furnishing engine 1204 can provide content data to a customizable display system as the customizable display system requests access to content corresponding to the content data, for which a user associated with the customizable display system has gained access rights.

The content datastore 1206 functions according to an applicable datastore for storing content data, such as the content datastores described in this paper. Content data stored in the content datastore 1206 can be used by a customizable display system to reproduce content for a user. Additionally, content data stored in the content datastore

1206 can include personas associated with specific content. Personas associated with specific content, as indicated by content data stored in the content datastore 1206 can be used to selectively provide content data to customizable display systems, for use in reproducing content by the display systems.

The user persona datastore 1208 functions according to an applicable datastore for storing user persona data indicating personas to which specific users have been mapped, such as the user persona datastores described in this paper. User persona data stored in the user persona datastore 1208 can be maintained by an applicable engine for mapping users to personas according to market segmentation variables, such as the persona mapping engines described in this paper. Additionally, user persona data stored in the user persona datastore 1208 can be used to selectively provide content data to a customizable display system. For example, if specific content represented by specific content data is associated with a specific persona and a user of a customizable display system has been mapped to the specific persona, as indicated by user persona data stored in the user persona datastore 1208, then the specific content data can be provided to the display system based on the mapping.

The content access rights datastore 1210 functions according to an applicable datastore for storing content access rights data used in controlling reproduction of content at a customizable display system, such as the content access rights datastores described in this paper. Content access rights data stored in the content access rights datastore 1210 can be used to selectively provide content data to a customizable display system for reproduction by the display system. For example, only content data of content to which a user associated with a customizable display system has access rights, as indicated by content access rights data stored in the content access rights datastore 1210, can be provided to the customizable display system. Additionally, content access rights data stored in the content access rights datastore 1210 can be used to control reproduction of content at a customizable display system. Content access rights data stored in the content access rights datastore 1210 can be maintained by an applicable engine for maintaining content access rights used in reproducing content at a customizable display system, such as the content access rights management engines described in this paper.

The content presentation rules datastore 1212 functions according to an applicable datastore for storing content presentation rules data indicating content presentation rules for controlling reproduction of content at a customizable display system, such as the content presentation rules datastores described in this paper. The content presentation rules datastore 1212 can store content presentation rules data generated based on input by an applicable entity for controlling content presentation rules. For example, the content presentation rules datastore 1212 can store content presentation rules data generated based on input received from an entity responsible for managing advertisements of products. In another example, the content presentation rules datastore 1212 can store content presentation rules data generated based on input received from a user or entity who created content capable of being reproduced at a customizable display system. Content presentation rules data stored in the content presentation rules datastore 1212 can be maintained by an applicable engine for maintaining content presentation rules for controlling reproduction of content at a customizable display system, such as the content presentation rules maintenance engines described in this paper.

The content reproduction direction engine 1214 functions to control reproduction of content at a customizable display system. In controlling reproduction of content, the content reproduction direction engine 1214 can generate and provide presentation instructions to a customizable display system, for use by the customizable display system to reproduce content using content data. For example, the content reproduction direction engine 1214 can send to a customizable display system a presentation instruction indicating a specific message to display, and the customizable display system can display the specific message in response to the presentation instruction. Additionally, in controlling reproduction of content, the content reproduction direction engine 1214 can select content for a customizable display system to reproduce. For example, the content reproduction direction engine 1214 can pseudo-randomly select a customized message from a list of customized messages to be displayed at a customizable display system.

In a specific implementation, the content reproduction direction engine 1214 functions to control reproduction of content according to content presentation rules. For example if content presentation rules specify a specific starting message to display from a list of messages, then the content reproduction direction engine 1214 can generate and send a presentation instruction to a customizable display system indicating to display the specific starting message. Further in the example, if content presentation rules specify to pseudo-randomly select a next message from the list of messages to display, then the content reproduction direction engine 1214 can select a next message from the list pseudo-randomly and subsequently generate and send presentation instructions specifying to display the next message. In controlling reproduction of content according to content presentation rules, the content reproduction direction engine 1214 can control reproduction of advertisements at a customizable display. For example, if content presentation rules specify to display an advertisement after every four messages are reproduced, then the content reproduction direction engine 1214 can generate and send a presentation instruction to a customizable display system indicating to display a specific advertisement.

In a specific implementation, the content reproduction direction engine 1214 functions to control reproduction of content at a customizable display system based on user personas. In controlling reproduction of content based on user personas, the content reproduction direction engine 1214 can select content presentation rules to use in controlling reproduction of content at a customizable display system based on user personas of users associated with the customizable display system. For example, if a user of a customizable display system is a 30 year old male, then the content reproduction direction engine 1214 can utilize content presentation rules specifically associated with a persona including 30 year old males in controlling the reproduction of content at the customizable display system.

In a specific implementation, the content reproduction direction engine 1214 functions to control reproduction of content at a customizable display system based on either or both received interaction data and environmental conditions data. The content reproduction direction engine 1214 can use content presentation rules in controlling reproduction of content at a customizable display system based on either or both received interaction data and environmental conditions data. For example, if interaction data indicates a user has changed an orientation of a customizable display system or a gamification device integrating the system, e.g. shaken the gamification device, and content presentation rules indicate to display a new message in response to a changes of orientation of the customizable display system or device integrated it, then the content reproduction direction engine 1214 can cause the new message to be reproduced by the customizable display system. In another example, if environmental conditions data indicates a temperate at a gamification device integrating a customizable display system has risen to a certain temperature above a threshold temperature, and content presentation rules specify to display the message "It is hot" if the temperature at the gamification device rises above the threshold temperature, then the content reproduction direction engine 1214 can cause the customizable display system to display the message "It is hot."

The content reproduction analytics engine 1216 functions to maintain content reproduction analytics of a customizable display system in reproducing content. Content reproduction analytics is represented by content analytics data and includes applicable data related to reproduction of content at a customizable display system. For example, content analytics can include what content is actually reproduced at a customizable display system, times at which content is reproduced, what content is not reproduced, what content is not selected for potentially being reproduced at a customizable display system, how often content is reproduced, user interactions with a customizable display system or a gamification device integrated with a customizable display system, and environmental conditions at a customizable display system or a gamification device integrated with a customizable display system. Content reproduction analytics can be used to match people, e.g. through a social network platform. For example, if content reproduction analytics show two users react similarly in interacting with a gamification device integrating a customizable display system, then the two users can be matched or otherwise notified of their shared interactions.

The content reproduction analytics datastore 1218 functions to store content reproduction analytics data indicating content reproduction analytics of a customizable display system in reproducing content. Content reproduction analytics data stored in the content reproduction analytics datastore 1218 can be maintained by an applicable engine for maintaining content reproduction analytics of a customizable display system in reproducing content, such as the content reproduction analytics engines described in this paper. Content reproduction analytics data stored in the content reproduction analytics datastore 1218 can be used by an applicable entity to view content reproduction analytics of reproduction of content at a customizable display system. For example, an entity can view a number of times their advertisements were displayed to users through customizable display systems using content reproduction analytics data stored in the content reproduction analytics datastore 1218.

In an example of operation of the example system shown in FIG. 12, the content datastore 1206 functions to store content data of content capable of being reproduced at a customizable display system integrated as part of a gamification device. In the example of operation, the user persona datastore 1208 stores user persona data indicating a persona to which a user of the gamification device is mapped. Further, in the example of operation, the content furnishing engine 1204 selectively provides content data stored in the content datastore 1206 based on the persona to which the user of the gamification device is mapped. In the example of operation, the content presentation rules datastore 1212 stores content presentation rules for controlling reproduction of content by the customizable display system using the content data. Additionally, in the example of operation, the customized content reproduction management system 1202 receives interaction data indicating how a user has manipulated the gamification device. In the example of operation, the content reproduction direction engine 1214 controls the reproduction of content at the customizable display system based on how the user has manipulated the gamification device and according to the content presentation rules.

Figure 13:
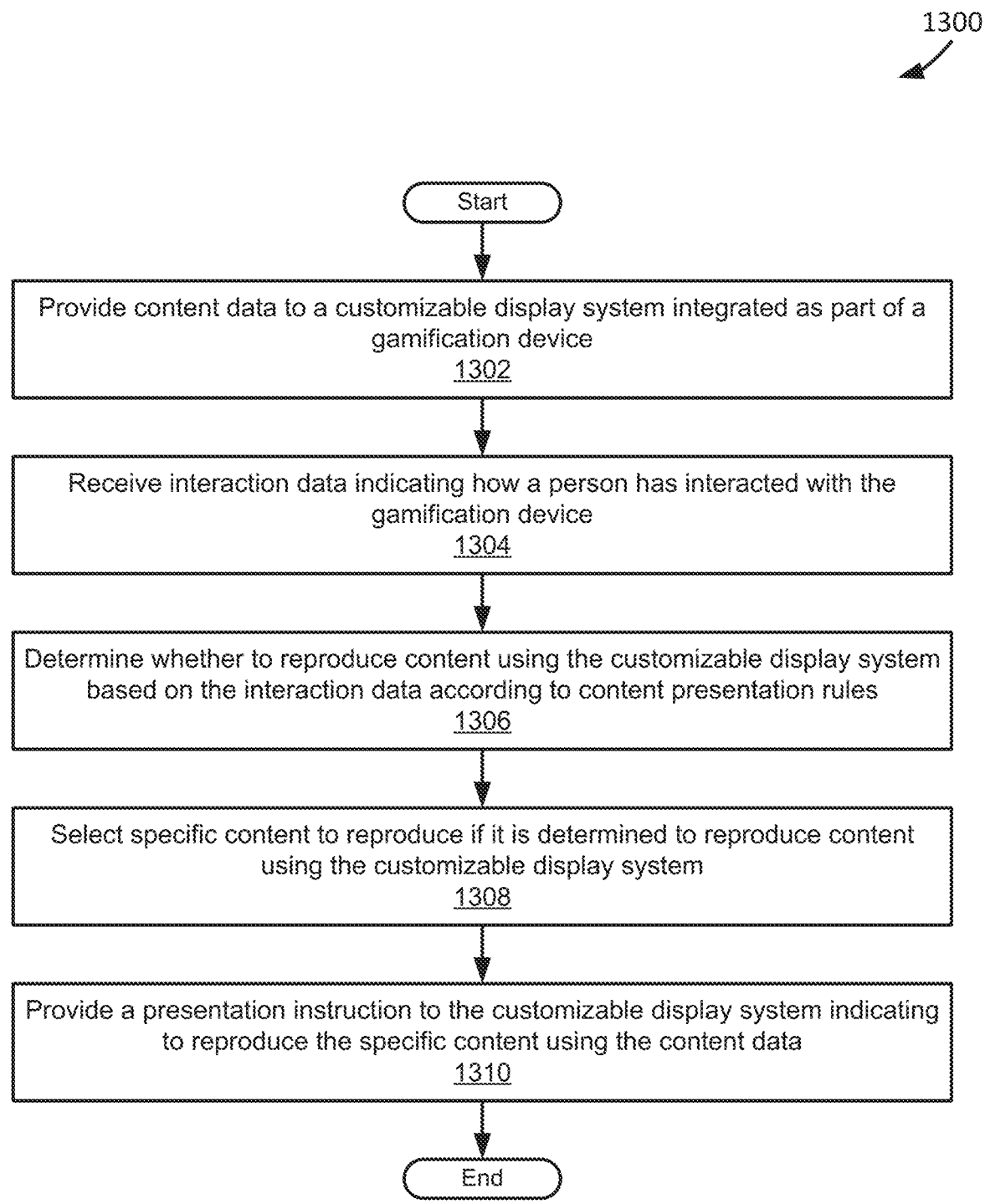
FIG. 13 depicts a flowchart of an example of a method for reproducing content at a customizable display system integrated as part of a gamification device based on user interaction with the gamification device.

FIG. 13 depicts a flowchart 1300 of an example of a method for reproducing content at a customizable display system integrated as part of a gamification device based on user interaction with the gamification device. The flowchart 1300 begins at module 1302, where content data is provided to a customizable display system integrated as part of a gamification device. Content data can be provided to a customizable display system integrated as part of a gamification device by an applicable engine for provisioning content data, such as the content furnishing engines described in this paper. Content data can be provided to a customizable display system based on whether a user associated with the customizable display system has access rights to content. Additionally, content data can be provided to a customizable display system based on whether a user person to which a user associated with the customizable display system is mapped.

The flowchart 1300 continues to module 1304, where interaction data indicating how a user interacted with the gamification device is received. Interaction data can be received by an applicable system for managing reproduction of content at the customizable display system, such as the customized content reproduction management systems described in this paper. Additionally interaction data can be generated by an applicable sensor or system for detecting user interaction with the gamification device. For example, interaction data can be generated by and received from an orientation sensor integrated as part of the customizable display system and the gamification device.

The flowchart 1300 continues to module 1306, where it is determined whether to reproduce content using the customizable display system based on the interaction data according to content presentation rules. An applicable engine for managing reproduction of content on a customizable display system, such as the content reproduction direction engines described in this paper, can determine whether to reproduce content using the customizable display system based on the interaction data according to content presentation rules. For example, if interaction data indicates a user has shaken the gamification device, and content presentation rules specify reproducing new content at the customizable display system if it is determined that a user has shaken the gamification device, then it can be determined to reproduce the new content at the customizable display system.

The flowchart 1300 continues to module 1308, where specific content to reproduce is selected, if it determined to reproduce content using the customizable display system. An applicable engine for managing reproduction of content on a customizable display system, such as the content reproduction direction engines described in this paper, can select specific content to reproduce if it is determined to reproduce content using the customizable display system. For example, if it is determined to switch a customized message on the customizable display system based on the user's actions in shaking the gamification device, then a new customized message can be selected for display at the customizable display system. Specific content to reproduce at the content display system can be determined based on one or an applicable combination of content access rights, content presentation rules, and a user persona to which the user is mapped.

The flowchart 1300 continues to module 1310, where a presentation instruction indicating to reproduce the specific content using the content data is provided to the customizable display system. The customizable display system can subsequently reproduce the specific content using the content data in response to receiving the presentation instruction indicating to reproduce the specific content. An applicable engine for managing reproduction of content on a customizable display system, such as the content reproduction direction engines described in this paper, can provide a presentation instruction indicating to reproduce the specific content to the customizable display system. A presentation instruction can be provided in response to a determination to reproduce content using the customizable display system based on the interaction data according to content presentation rules.

Figure 14:
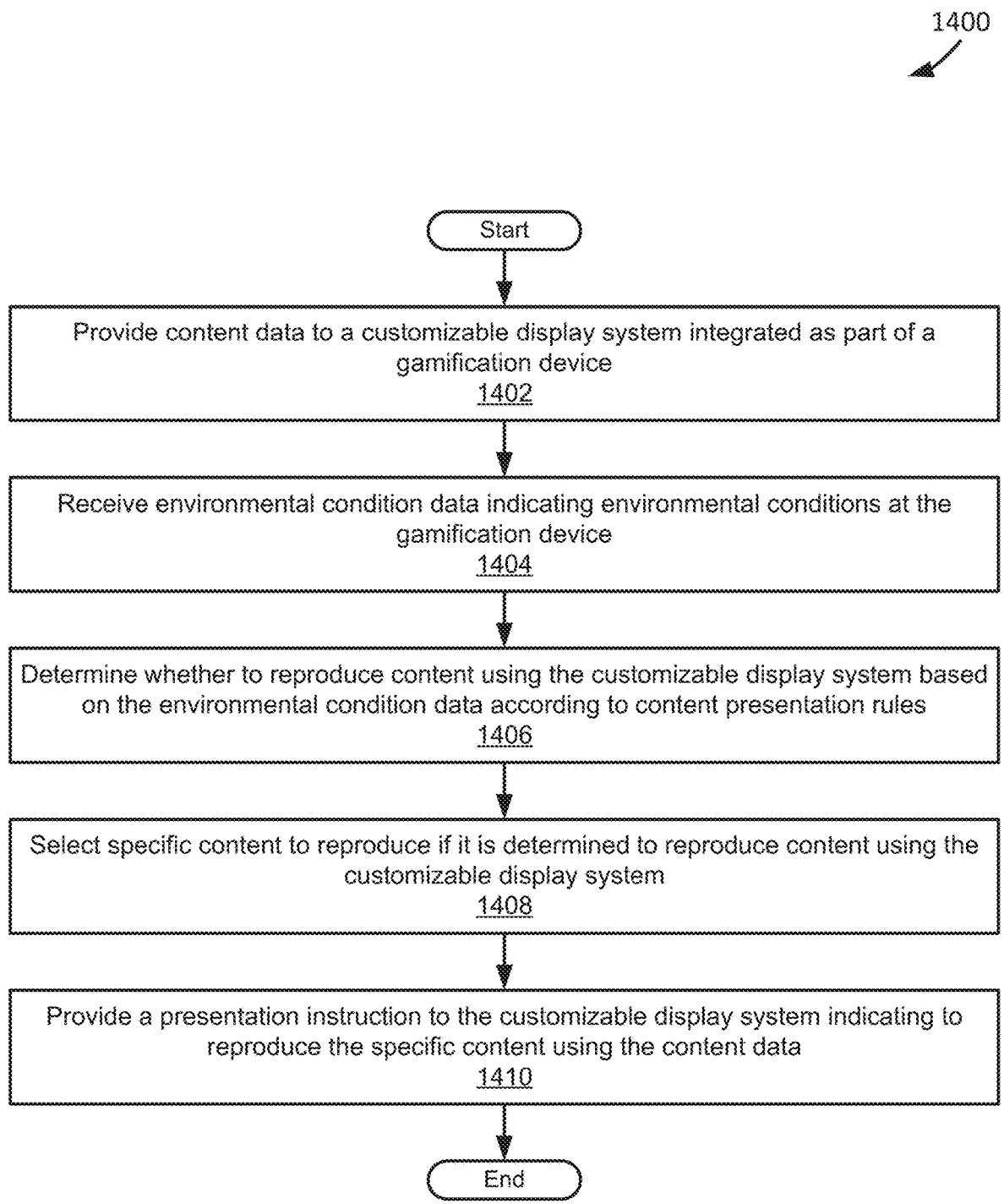
FIG. 14 depicts a flowchart of an example of a method for reproducing content at a customizable display system integrated as part of a gamification device based on environmental conditions at the gamification device.

FIG. 14 depicts a flowchart 1400 of an example of a method for reproducing content at a customizable display system integrated as part of a gamification device based on environmental conditions at the gamification device. The flowchart 1400 begins at module 1402, where content data is provided to a customizable display system integrated as part of a gamification device. Content data can be provided to a customizable display system integrated as part of a gamification device by an applicable engine for provisioning content data, such as the content furnishing engines described in this paper. Content data can be provided to a customizable display system based on whether a user associated with the customizable display system has access rights to content. Additionally, content data can be provided to a customizable display system based on whether a user person to which a user associated with the customizable display system is mapped.

The flowchart 1400 continues to module 1404, where environmental conditions data indicating conditions of an environment at the gamification device is received. Environmental conditions data can be received by an applicable system for managing reproduction of content at the customizable display system, such as the customized content reproduction management systems described in this paper. Additionally environmental conditions data can be generated by an applicable sensor or system for detecting environmental conditions at the gamification device. For example, environmental conditions data can be generated by and received from a temperature sensor integrated as part of the customizable display system and the gamification device.

The flowchart 1400 continues to module 1406, where it is determined whether to reproduce content using the customizable display system based on the environmental conditions data according to content presentation rules. An applicable engine for managing reproduction of content on a customizable display system, such as the content reproduction direction engines described in this paper, can determine whether to reproduce content using the customizable display system based on the environmental conditions data according to content presentation rules. For example, if environmental conditions data indicates a specific temperature at the gamification device greater than a threshold temperature, and content presentation rules specify reproducing a new message at the customizable display system if it is determined that a temperature at the gamification device is greater than the threshold temperate, then it can be determined to reproduce a new message at the customizable display system.

The flowchart 1400 continues to module 1408, where specific content to reproduce is selected, if it determined to reproduce content using the customizable display system. An applicable engine for managing reproduction of content on a customizable display system, such as the content reproduction direction engines described in this paper, can select specific content to reproduce if it is determined to reproduce content using the customizable display system. For example, if it is determined to switch a customized message on the customizable display system based on the user's actions in shaking the gamification device, then a new customized message can be selected for display at the customizable display system. Specific content to reproduce at the content display system can be determined based on one or an applicable combination of content access rights, content presentation rules, and a user persona to which the user is mapped.

The flowchart 1400 continues to module 1410, where a presentation instruction indicating to reproduce the specific content using the content data is provided to the customizable display system. The customizable display system can subsequently reproduce the specific content using the content data in response to receiving the presentation instruction indicating to reproduce the specific content. An applicable engine for managing reproduction of content on a customizable display system, such as the content reproduction direction engines described in this paper, can provide a presentation instruction indicating to reproduce the specific content to the customizable display system. A presentation instruction can be provided in response to a determination to reproduce content using the customizable display system based on the environmental conditions data according to content presentation rules.

Figure 15:
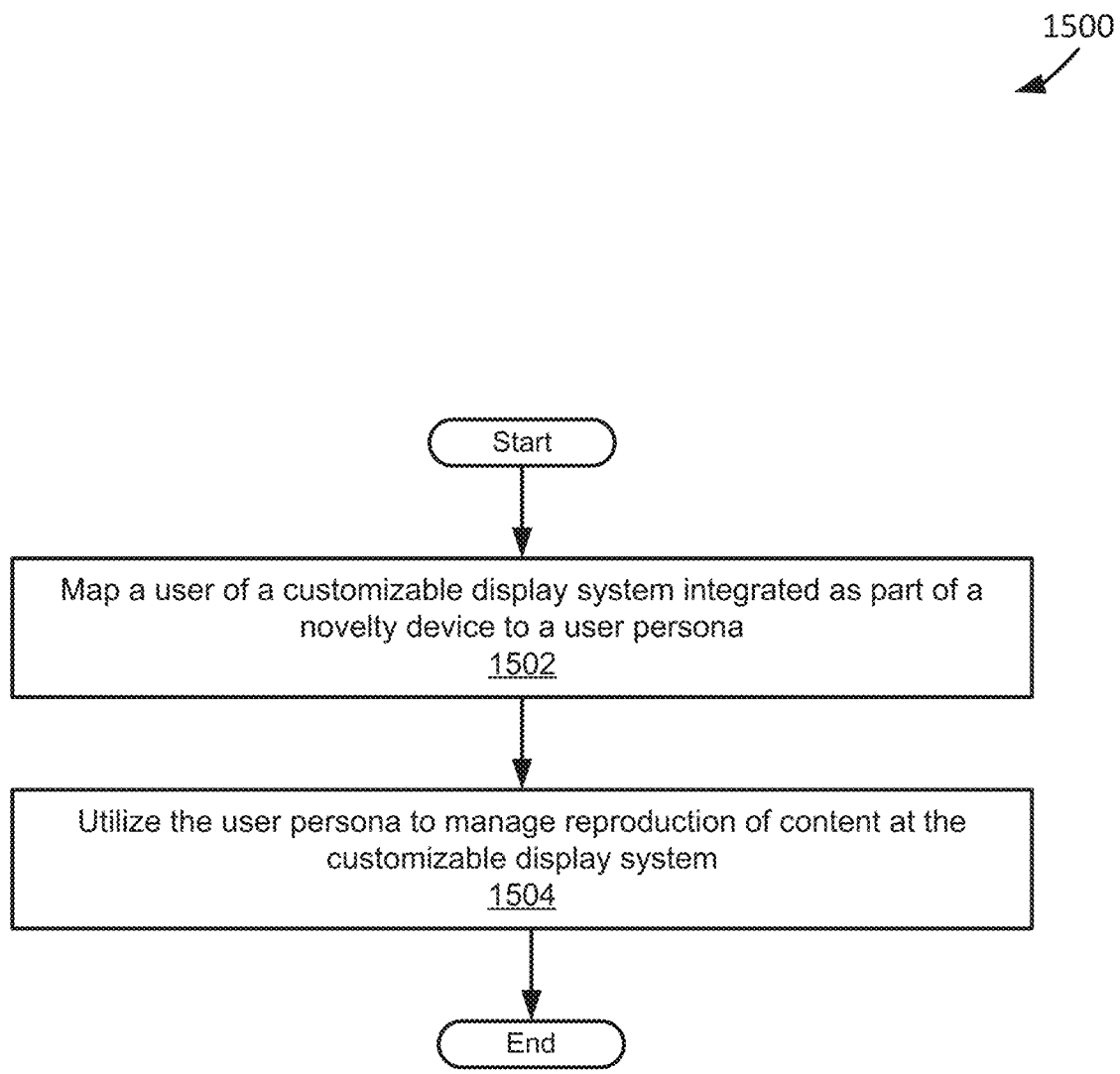
FIG. 15 depicts a flowchart of an example of a method of reproducing content on a customizable display system according to user personas.

FIG. 15 depicts a flowchart 1500 of an example of a method of reproducing content on a customizable display system according to user personas. The flowchart 1500 begins at module 1502, where a user of a customizable display system integrated as part of a gamification device is mapped to a user persona. An applicable engine for mapping a user to a persona, such as the persona mapping engines described in this paper, can map a user of a customizable display system integrated as part of gamification device to a user persona. A user of a customizable display system integrated as part of gamification device can be mapped to a user persona based on market segmentation variables. For example if a user is a male between the ages of twenty and twenty-five living within a specific region, then the user can be mapped to a user persona including males between the ages of twenty and twenty-five living within the specific region.

The flowchart 1500 continues to module 1504, where the user persona is utilized to manage reproduction of content at the customizable display system. In utilizing the user persona to manage reproduction of content at the customizable display system, content data can be selectively provided to the customizable display system based on the user persona. For example, if specific content reproduced by specific content data is associated with a specific user persona and a user of the customizable display system is mapped to the specific user persona, then the specific content data can be provided to the customizable display system. Additionally, in utilizing the user persona to manage reproduction of content at the customizable display system, content presentation rules specific to the user persona can be applied in managing reproduction of content at the customizable display system. For example, if a user of the customizable display system is mapped to a user persona including males within the ages of twenty to twenty-five, then content presentation rules for controlling reproduction of content specific to males between the ages of twenty and twenty-five can be used in managing reproduction of content at the customizable display system.

Figure 16:
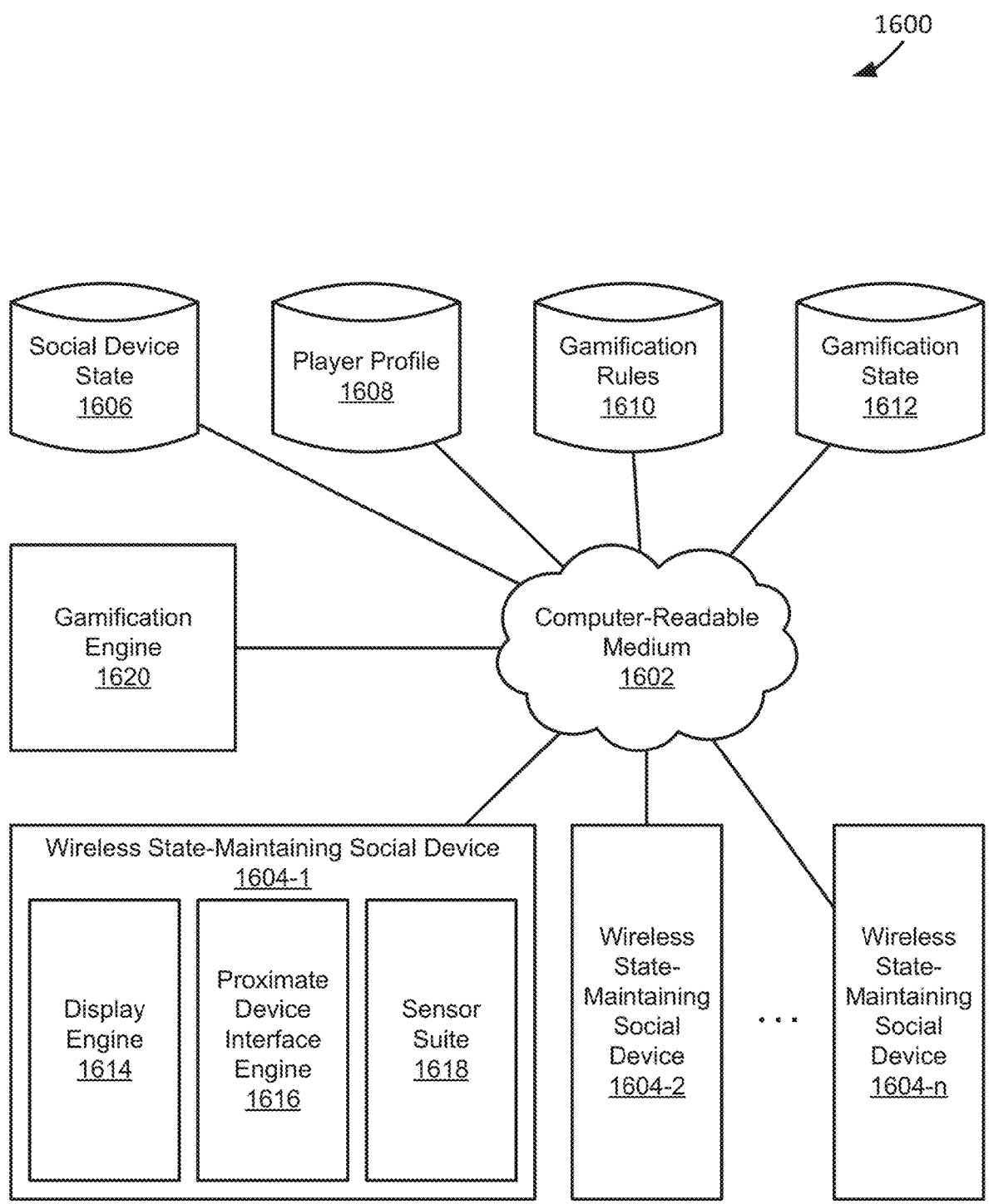
FIG. 16 depicts an example of an ad hoc wireless state-maintaining social device network.

FIG. 16 depicts a diagram 1600 of an example of a wireless state-maintaining social device network. The diagram 1600 includes a computer-readable medium 1602, a wireless state-maintaining social device 1604-1 and a wireless state-maintaining social device 1604-2 to a wireless state-maintaining social device 1604-n (collectively, the a wireless state-maintaining social devices 1604) coupled to the computer-readable medium 1602, a social device state datastore 1606 coupled to the computer-readable medium 1602, a player profile datastore 1608 coupled to the computer-readable medium 1602, a gamification rules datastore 1610 coupled to the computer-readable medium 1602, a gamification state datastore 1612 coupled to the computer-readable medium 1602, and a gamification engine 1620 coupled to the computer-readable medium 1602.

The wireless state-maintaining social devices 1604 are intended to represent devices such as were described by way of example with reference to FIGS. 1-15. The wireless state-maintaining social devices 1604 include a display engine 1614, a proximate device interface engine 1616, and a sensor suite 1618. The display engine 1614 can include an LCD display, a haptic feedback engine, a speaker, or some other mechanism for providing a stimulus detectable by a player (or human or artificial agent of a player). The proximate device interface engine 1616 represents an interface for communicating with a proximate smartphone or other device with which a game or a tokenized player of a game is associated. As used here, "tokenized" means some form of control has been passed to a player and recognized as part of game state. The sensor suite 1618 can include sensors capable of detecting stimuli suitable for determining location, orientation, and other state of the wireless state-maintaining social devices 1604.

The gamification engine 1620 utilizes the datastores 1606-1612 to support an instance of a game or gamified activity, such as ice breakers, educational activities, or the like that includes the wireless state-maintaining social devices 1604. The gamification engine 1620 (and the datastores 1606-1612) can be implemented on one or more of the wireless state-maintaining social devices 1604, or distributed across them, or on some other device, such as a smartphone or across multiple other devices, but is provided as a distinct engine for illustrative purposes. In a specific implementation, the wireless state-maintaining social devices 1604 can utilize the sensor suite 1618 to distinguish between when they are shaken, passed, thrown, caught, or dropped, as well as characteristics about the various states, such as how hard, fast, or the frequency with which a device is shaken, passed, or thrown. Using Bluetooth or some other applicable short range communication protocol and relevant hardware, the wireless state-maintaining social devices 1604 can communicate with nearby devices, such as smartphones, ibeacons, wireless access points, a dedicated wrist band paired with the state-maintaining social device, or the like to determine who has the state-maintaining social device (e.g., tokenized player, nearest player, or the like). Alternatively or in addition, the wireless state-maintaining social devices 1604 can use a GPS chip to determine location (location is maintained as state). Other such state can include static state over time, flight (including parameters of flight), light level, time (e.g., day/night), shake (including parameters of the shake), orientation, borrowed state (e.g., from a nearby smartphone), and ad hoc state-maintaining social device network state. These states can be stored in the social device state datastore 1606. A user state (e.g., demographic, previously asked questions, heartbeat detected by a nearby smartphone) can be stored in the player profile datastore 1608. In a specific implementation, the wireless state-maintaining social devices can be calibrated for a group, taking into account player demographics, psychographics, geographics, behavioristics, and other aspects of a player profile found in the player profile datastore 1608. Game rules and game state can be stored in the gamification rules datastore 1610 and the gamification state datastore 1612, respectively.

Figure 17:
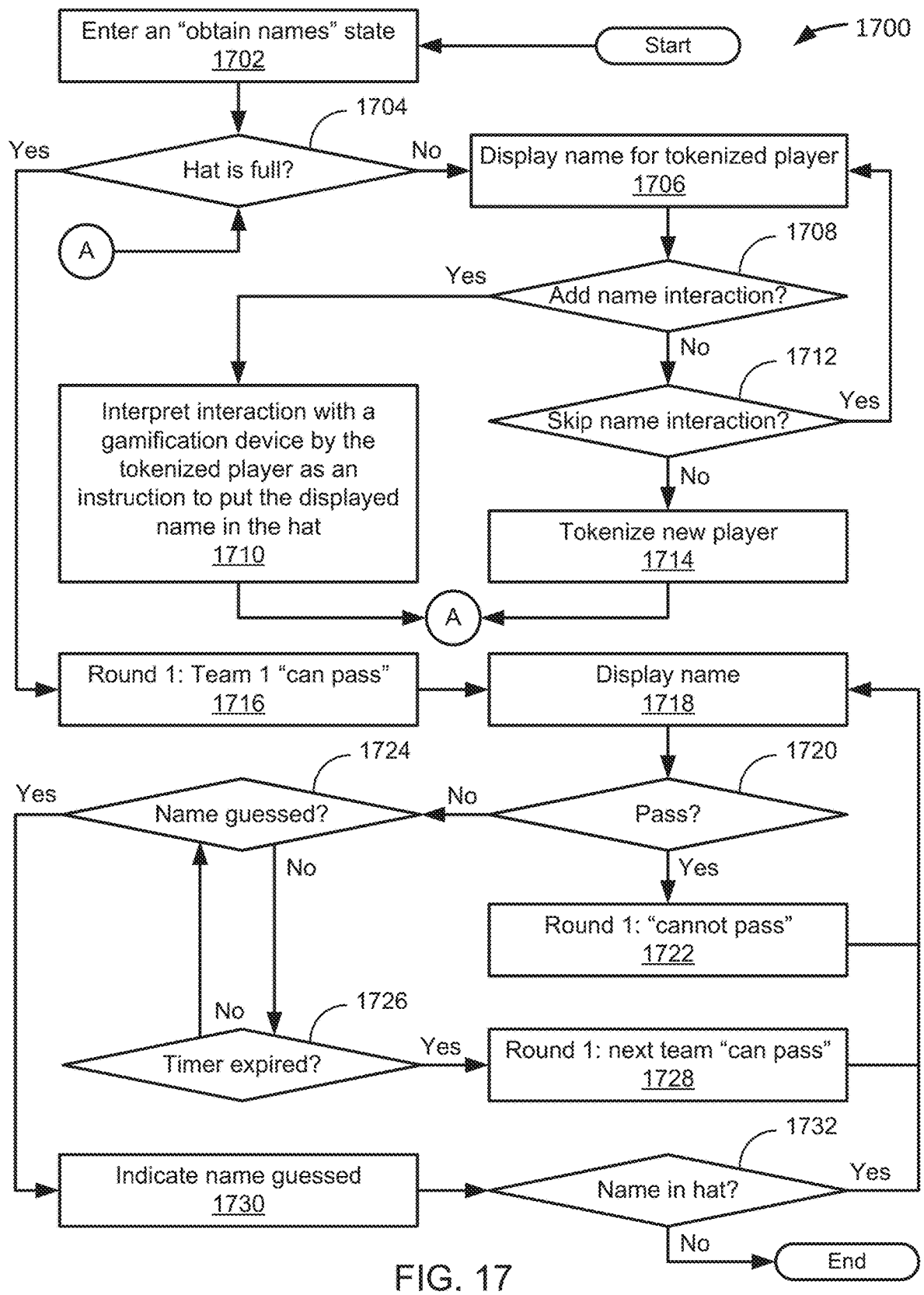
FIG. 17 depicts a flowchart of an example of a social game (celebrity) played with one or more wireless state-maintaining social devices.

FIG. 17 depicts a flowchart 1700 of an example of a social game (celebrity) played with one or more wireless state-maintaining social devices, such as the wireless state-maintaining social devices 1604 described with reference to FIG. 16. In a typical celebrity game, players split up into two teams and write down 5-10 celebrities per player on slips of paper, which are placed in a hat. In the example of FIG. 17, the flowchart 1700 starts at module 1702 where the wireless state-maintaining social devices are in an "obtain names" state that can be correlated with the part of a typical celebrity game during which players are putting names in a hat. In a specific implementation, a gamification engine, such as the gamification engine 1620 described with reference to FIG. 16, picks names of celebrities with which players are likely familiar (e.g., 10 names for a first player that are likely known to the first player, 10 names for a second player that are likely known to the second player, and so forth). An advantage of this approach is the names can be added to the "hat" without spending time to explicitly add them. The gamification engine may or may not also weigh names in favor of those that are also likely to be known to other players. For children, in lieu of a name, the gamification engine can instruct the relevant wireless state-maintaining social device to display an image of a character the child will likely know (e.g., Mickey Mouse or Pikachu). In a specific implementation, while in an "obtain names" state, Team 1 passes a first wireless state-maintaining social device, such as the wireless state-maintaining social device 1604-1 described with reference to FIG. 16, from player to player on the team. In a specific implementation, Team 2 passes a second wireless state-maintaining social device, such as the wireless state-maintaining social device 1604-2 described with reference to FIG. 16, from player to player on the team. In an alternative, players of different teams share one or more wireless state-maintaining social devices while in obtain names state.

The flowchart 1700 continues to decision point 1704 with determining whether a hat is full. The hat is full when each player has provided a number of names as indicated in a gamification rules datastore, such as the gamification rules datastore 1610 described with reference to FIG. 16. How much flexibility there is in providing names (e.g., whether the number of names can be changed, different per player, or the like) is configuration- and/or implementation-specific. For example, players could enter alternative numbers of names via the gamification engine to change the rules for an instance of a game. For simplicity, it is assumed each player enters a static number of names (say, 10) and the obtain names state only ends when all players have submitted the 10 names.

If it is determined the hat is not full (1704—No), then the flowchart 1700 continues to module 1706 where a name is displayed for a tokenized player. When in the hands of a first player, the gamification engine, with knowledge that the first player is tokenized (e.g., is holding or otherwise in control of a wireless state-maintaining social device), consults a player profile from a player profile datastore, such as the player profile datastore 1608 described with reference to FIG. 16, that is associated with the first player. The gamification engine instructs a display engine of the wireless state-maintaining social device to display a name the gamification engine has determined is reasonably likely known to the first player that can be "put in the hat." For young children, it may be desirable to display an image instead of a name in text, which should reduce the age requirements for a game like celebrity, for which the recommended age is 8 years old.

The flowchart 1700 continues to decision point 1708 where it is determined whether the wireless state-maintaining social device is manipulated such that an add name interaction is detected. If the tokenized player wishes, the tokenized player can indicate by manipulating the wireless state-maintaining social device such that the displayed name is put in the hat, which, for the sake of this example, means the tokenized player pushes a button on the state-maintaining social device.

If it is determined that the first wireless state-maintaining social device is manipulated such that an add name interaction is detected (1708—Yes), then the flowchart 1700 continues to module 1710 with interpreting interaction with the gamification device by the tokenized player as an instruction to put the displayed name in the hat. In a specific implementation, the gamification engine modifies a gamification state datastore, such as the gamification state datastore 1612 described with reference to FIG. 16, to include the name that was added to the hat and attributes the addition of the name to the tokenized player. In a specific implementation, the gamification state datastore cannot include duplicate names; the gamification engine consults the gamification state datastore before displaying a name that is already in the gamification state datastore. The flowchart 1700 then returns to decision point 1704 and continues as described previously.

If, on the other hand, it is determined that the wireless state-maintaining social device is manipulated such that an add name interaction is not detected (1708—No), then the flowchart 1700 continues to decision point 1712 where it is determined whether the wireless state-maintaining social device is manipulated such that a skip name interaction is detected. If the tokenized player wishes, the tokenized player can indicate by manipulating the wireless state-maintaining social device such that the displayed name is skipped, which, for the sake of this example, means the tokenized player shakes the gamification device.

If it is determined that the wireless state-maintaining social device is manipulated such that a skip name interaction is detected (1712—Yes), then the flowchart 1700 returns to module 1706 and continues as described previously. For illustrative simplicity, it is assumed if a tokenized player neither wishes to add a name nor skip a name that the gamification device is passed on to another player. Accordingly, if it is determined that the wireless state-maintaining social device is manipulated such that a skip name interaction is not detected (1712—No), then the flowchart 1700 continues to module 1714 where a new player is tokenized, then returns to decision point 1704 and continues as described previously.

Alternatives for entering names into the hat exist. For example, while an untokenized player waits for a tokenized player to finish, the untokenized player can, if available, be entering names in a Celebrity Application running on a smartphone such that when the wireless state-maintaining social device tokenizes the presently untokenized player, the gamification engine can automatically upload the entered names to the gamification state datastore. The updates to the list of names can be accomplished in any order, allowing a tokenized player who wants to add explicit names via a Celebrity Application to pass the wireless state-maintaining social device to a presently untokenized player who is ready to upload names or wants to see suggestions on the display of the wireless state-maintaining social device. It should be noted a single wireless state-maintaining social device can be passed to each player of each team, or multiple wireless state-maintaining social devices can be passed around, with no particular need to limit the number of wireless state-maintaining social devices in use. (Indeed, every player could have their own device.) In an alternative, players can maintain a list of names they know and names can be selected from that list, parents could have names selected based upon homework assignments of their children, artists can be selected from a known playlist or watchlist, or the list can be generated in advance of or during a game in some other applicable manner.

When it is determined the hat is full (1704—Yes) because all players have entered the requisite number of names, the flowchart 1700 continues to module 1716 with entering a "can pass" state for Round 1, Team 1. In a specific implementation, the names in the hat are stored in data structures in the gamification state datastore, along with, e.g., a round one scoring indication, a round two scoring indication, a round three scoring indication, a round one time to guess value, a round two time to guess value, and a round three time to guess value. The gamification state datastore may or may not also include which player added and which player guessed the name. As the game progresses, the data structure can be updated to indicate which team guessed the name (+1 point) or passed (−1 point) and the amount of time spent to reach that disposition. It may be desirable to maintain the list of names for future recommendations to players who participate in the game (under the assumption once the name has been played once, they are more likely to know the celebrity) or to not recommend the name (under the assumption the player might not want to play the same name more than once). This can be of particular value in a trivia-guessing game because you do not want to enable players to learn all of the answers to questions.

In a typical celebrity game, in round one, Team 2 chooses a timekeeper and a scorekeeper and Team 1 chooses a clue giver. Advantageously, by making use of a gamification device, the timekeeper and scorekeeper can be eliminated and the clue giver need not keep track of a physical hat (or bag), as described here.

The flowchart 1700 continues to module 1718 where, in round one, the clue giver activates a first wireless state-maintaining social device, which displays a first name from the names put in the hat by all applicable players. In this example, activation is assumed to mean the clue giver presses a button, but it could be shaking or some other stimulus the first state-maintaining social device can detect. Moreover, this activation could be preceded by an explicit clue giver assignment step, such as by requiring a player to press a button to be designated the clue giver, then press the button again to display a name. When activated, the gamification engine updates the gamification datastore to indicate a name has been taken from the hat (in this case, in round 1), the timer starts—making a timekeeper on Team 2 unnecessary—and the same name as is displayed on the first wireless state-maintaining social device is also displayed on a second wireless state-maintaining social device, making the name visible to both the clue giver (on Team 1) and one or more of the Team 2 players.

The flowchart 1700 continues to decision point 1720 where it is determined whether the clue giver has passed. (Note: As indicated in module 1716, the game state is currently "can pass.") While in a "can pass" state, the clue giver can shake the first wireless state-maintaining social device to replace the first displayed name with a second displayed name, making it unnecessary for the clue giver to search for a hat, reach into the hat, open a piece of paper, and decipher the handwriting of a player. Rather, without interrupting the flow of the game, the clue giver can simply shake the first wireless state-maintaining social device and glance down at a display of the first wireless state-maintaining social device.

When the sensor suite of the first wireless state-maintaining social device detects stimuli sufficient for the gamification engine to determine the clue giver intends to pass (1720—Yes), the flowchart 1700 continues to module 1722 with entering a "cannot pass" game state Round 1, Team 1. When entering this state, the gamification engine updates the gamification state datastore to indicate the clue giver passed. In accordance with the rules of celebrity, the gamification state datastore is updated to indicate Team 1 has lost a point for passing. If the sensor suite of the first wireless state maintaining social device does not detect stimuli sufficient for the gamification engine to determine the clue giver intends to pass (1720—No), if the game state is "cannot pass," or if the last name from the hat is being displayed (under the assumption a clue giver is better off not passing because it costs a point, whereas failing to guess the name does not cost a point) then the flowchart 1700 continues to decision point 1724 where it is determined whether the name has been guessed.

Once a clue has been given, the clue giver is not allowed to pass, but the limitation may or may not be built into the game system. For example, although a clue giver is not allowed to pass, the game may simply rely upon the clue giver to follow the rules and not shake the first wireless state-maintaining social device. Alternatively, Team 2 could enforce the rule by pressing a button on the second wireless state-maintaining social device when a first clue is given to prevent the clue giver from being able to pass after giving a clue. As another alternative, the first wireless state-maintaining social device (or some other device with the capability, such as a smart phone) can listen for key words (e.g., "first clue") or other indicia that the clue giver has begun giving clues, which can be flagged by any player (e.g., players on Team 2 could say "first clue" once the clue giver gives a clue) making the clue giver unable to pass after it is determined that the clue giver has given a clue. Strictly speaking, the players can be relied upon to enforce game state even if the gamification state datastore is not updated. For example, if a clue giver agrees not to shake the first wireless state-maintaining social device after giving a clue, the rule is enforced. This is similar to the rules regarding the clue giver saying part of a celebrity name or giving a name-rhyming clue, a foreign language clue, or a spelling clue, which are prohibited under the usual celebrity rules. The players simply agree not to break the rules, so it is not necessary to track when a foul occurs. However, if desired, players of Team 2 could "throw a flag" by pressing a button on the second wireless state-maintaining social device, which could be resolved in a manner that is implementation-specific.

If it is determined the name has not been guessed (1724—No), then the flowchart 1700 continues to decision point 1726 where it is determined whether the timer has expired and returns to decision point 1724 so long as the timer has not expired (1726—No), but, when the time has expired (1726—Yes) continues to module 1728 with entering a "can pass" state for Round 1, Team 2 and the flowchart returns to module 1718 and continues as described previously, but for Team 2 instead of Team 1. When the timer expires (e.g., after one minute), the wireless state-maintaining social device will no longer display additional names. At this point, control passes to the other team and a new clue giver presses a button (starting a new timer). Round one continues, with each team attempting to guess names before passing control back to the other team when the timer expires, until all names in the hat have been attempted.

If, on the other hand, it is determined the name has been guessed (1724—Yes), then the flowchart 1700 continues to module 1730 where it is indicated the name has been guessed and to decision point 1732 where it is determined whether at least one name is still in the hat. When a name is guessed, the gamification engine updates the score for the team with the player that guessed the name. In a specific implementation, when a player correctly guesses the name displayed by the display engine, the clue giver tosses or otherwise passes the wireless state-maintaining social device to the player that guessed the name, which allows the gamification engine to determine which player guessed the name (assuming the proximate device interface engine is capable of gathering sufficient data to make the determination). There is generally no reason for the game to stop or slow down if the player cannot be identified because who guessed the name need not be tracked for scoring purposes, so simply the fact the wireless state-maintaining social device was manipulated in such a way that the sensor suite can provide the gamification engine with data sufficient to determine the wireless state-maintaining social device was passed from one player to another can be treated as sufficient reason to proceed to decision point 1732.

When it is determined there is still at least one name in the hat (1732—Yes), the flowchart 1700 returns to module 1718 and continues as described previously. When the player tosses or passes the wireless state-maintaining social device back to the clue giver, the display engine displays a next name. In an alternative, the player who guessed the name could become the clue giver, which would mean as soon as the wireless state-maintaining social device state indicates the wireless state-maintaining social device has been passed to a new player, the display engine displays a next name. Advantageously, by passing the device to the player that guessed the name, the game is made more active and manual dexterity can come into play, and the enforcement of rules becomes more natural in the sense that a clue giver will behave differently when a name is guessed and when the clue giver wishes to pass. If, on the other hand, it is determined there are no more names in the hat (1732—No), then the flowchart 1700 ends. When a game ends, a score for each team will typically be displayed, with an amount of detail that is implementation- and configuration-specific (e.g., fastest clue giver, most difficult name, leaderboards, or the like).

A typical celebrity game has 3 rounds, and the flowchart 1700 could be expanded to accommodate additional rounds with modules and decision points similar to those described above (see module 1716 to decision point 1732). For example, following decision point 1732 the game progresses to round two during which the clue giver can only give a single one-word clue for each celebrity name, but otherwise follows the flowchart 1700 from module 1716 to decision point 1732 and then to round three during which the clue giver cannot use any words, only actions, to give clues. The state-maintaining social device can be configured to provide hints to participants at a rate that depends upon a player profile. For example, a 5-year-old can have a hint trigger more quickly than that of an adult. An example of a hint is playing music from Fantasia when the celebrity is Walt Disney.

Figure 18:
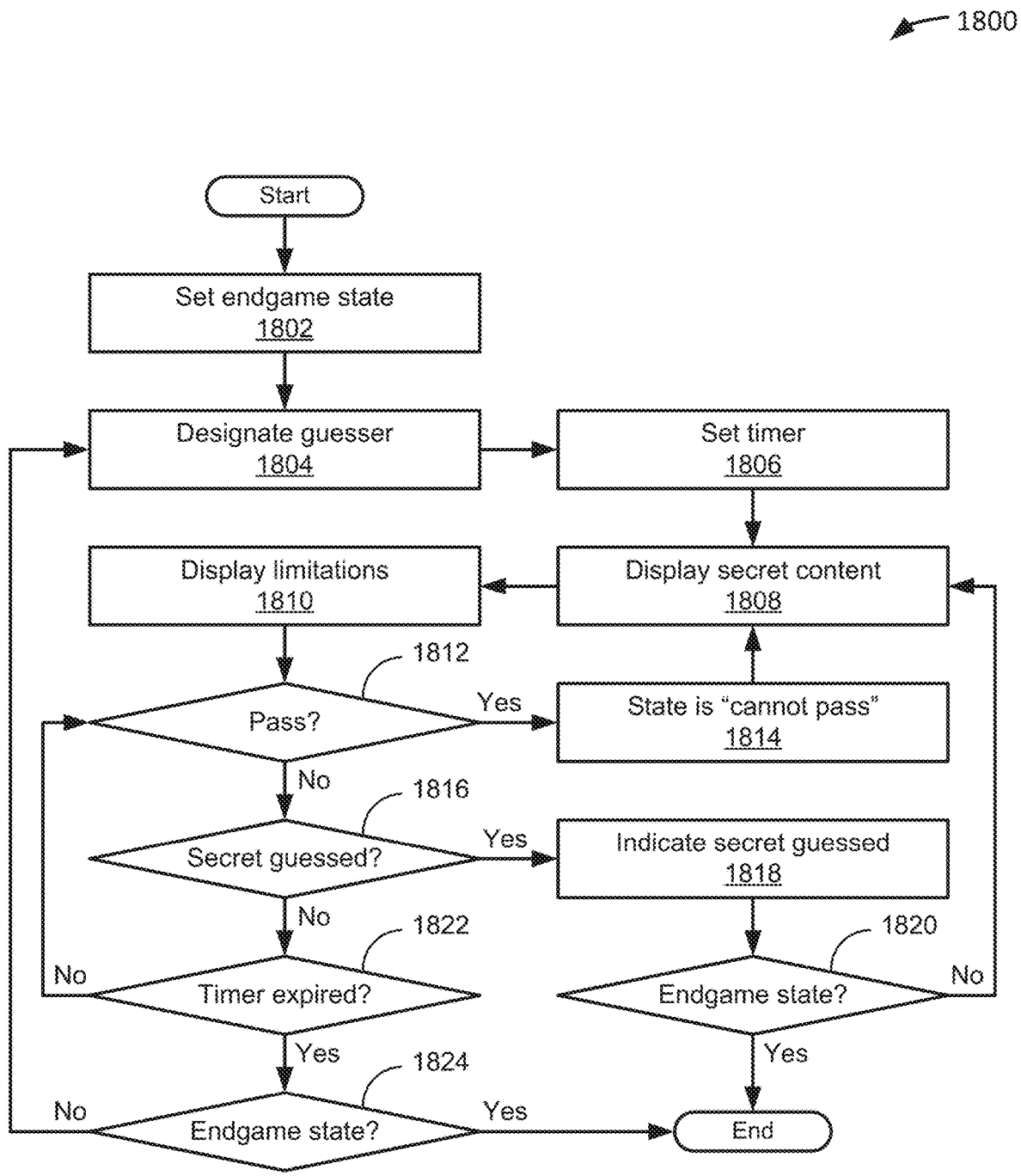
FIG. 18 depicts a flowchart of an example of a social game (reverse charades) played with multiple wireless state-maintaining social devices.

FIG. 18 depicts a flowchart 1800 of an example of a social game (reverse charades) played with multiple wireless state-maintaining social devices, such as the wireless state-maintaining social devices 1604 described with reference to FIG. 16. In a typical reverse charades game, players split up into two teams and decide on a number or rounds or a point target to win, but for this example, it is assumed there is a single round and the team with the highest number of points wins. One word guessed correctly provides one point. The flowchart 1800 starts at module 1802 with setting endgame state. Advantageously, the number of rounds and/or points to win can be randomized, which eliminates the need to establish endgame state in a traditional game of reverse charades, thereby speeding up play and potentially adding some unexpected rules.

The flowchart 1800 continues to module 1804 with designating a guesser. Advantageously, the gamification engine can determine which team will go first and which player of the team will be the guesser randomly, which increases speed with which the game can be played and excitement as players figure out who is the guesser and attempt to direct their efforts towards the guesser.

The flowchart 1800 continues to module 1806 with setting a timer. In a typical reverse charades game, a team selects a guesser and has one minute to guess as many words as possible and can pass once. Advantageously, a gamification engine can select a guesser automatically or randomly, which increases game speed, and, if desired, provides more or less time that depends upon player profile.

The flowchart 1800 continues to module 1808 with displaying secret content to players, other than the guesser, on the same team as the guesser. If desired, the secret content can also be displayed on the wireless state-maintaining social devices of members of the other team so they can be in on the secret. In a specific implementation, the secret is only displayed on wireless state-maintaining social devices with a tokenized player to avoid having the secret being displayed in a manner that could result in the guesser accidentally seeing it.

The flowchart 1800 continues to module 1810 with displaying limitations to players, other than the guesser, on the same team as the guesser. In a specific implementation, the secret content can be displayed with a limitation. For example, each player who is not the guesser receives a word "carnival," but they also include a limiting requirement, such as "animals only," "rides only," or the like. Depending upon a player profile, players may receive hints instead of limitations, such as pictures, to enable, e.g., particularly young players to participate.

The flowchart 1800 continues to decision point 1812 where it is determined whether the guesser has manipulated the wireless state-maintaining social device to indicate the guesser wishes to pass. In a specific implementation, the guesser presses a button to pass. If it is determined that the guesser has manipulated the wireless state-maintaining social device to indicate the guesser wishes to pass (1812—Yes), then the flowchart 1800 continues to module 1814 where the game state is changed to "cannot pass" for the remainder of the round and returns to module 1808 and continues as described previously, but at decision point 1812 the guesser cannot pass. In an alternative, depending upon game rules or player profile (e.g., if the player is particularly young), a guesser may have the option to pass more than once.

If, on the other hand, it is not determined that the guesser has manipulated the wireless state-maintaining social device to indicate the guesser wishes to pass (1812—No) or if state is "cannot pass," then the flowchart 1800 continues to decision point 1816 where it is determined whether the secret content has been guessed. Each team member other than the guesser has one of the wireless state-maintaining social devices (or shares one) and acts out the secret content (with limitations, if applicable) displayed by the display engine of the wireless state-maintaining social device. In a specific implementation, all of the players on the team of the guesser must shake their wireless state-maintaining social devices to indicate the secret has been guessed, which serves to involve all of the players in the game and has a secondary function of showing the other team that a point was scored (as opposed to passing, for which no point is awarded).

If it is determined that the secret content has been guessed (1816—Yes) then the flowchart 1800 continues to module 1818 where the gamification engine updates the game state datastore to increase the score of the guesser's team by one and the flowchart 1800 continues to decision point 1820 where it is determined whether endgame state has been reached. If it is not determined that endgame state has been reached (1820—No), then the flowchart 1800 returns to module 1808 continues as described previously. If it is determined that endgame state has been reached (1820—Yes), then the flowchart 1800 ends. In a specific implementation, when the game is over, scores, times, and notable events or players are displayed and may be recorded as a historical log in various player profiles. The historical log can be used to avoid selecting the same secret multiple times for the same player (or to select the same secret again for, e.g., younger players).

If, on the other hand, it is not determined that the secret content has been guessed (1816-No), then the flowchart 1800 continues to decision point 1822 where it is determined whether the timer has expired. The progress of the timer can be displayed by the display engine of one or more of the wireless state-maintaining social devices as a diminishing hourglass, timer countdown, changing lights, or the like. If it is not determined that the timer has expired (1822—No), then the flowchart 1800 returns to decision point 1812 and continues as described previously. If, on the other hand, it is determined that the timer has expired (1822—Yes), then the flowchart 1800 continues to decision point 1824 where it is determined whether endgame state has been reached. When the timer expires, the display engine ceases displaying secrets to the players who were aiding the guesser. If it is determined that endgame state has been reached, then the flowchart 1800 ends, as described previously. If it is not determined endgame state has been reached (1824—No), then the flowchart 1800 returns to module 1804 and continues as described previously, but for a new guesser. Depending upon the rules, the guesser may be another player on the same team or, pursuant to more typical reverse charades rules, a player on the other team.

Figure 19:
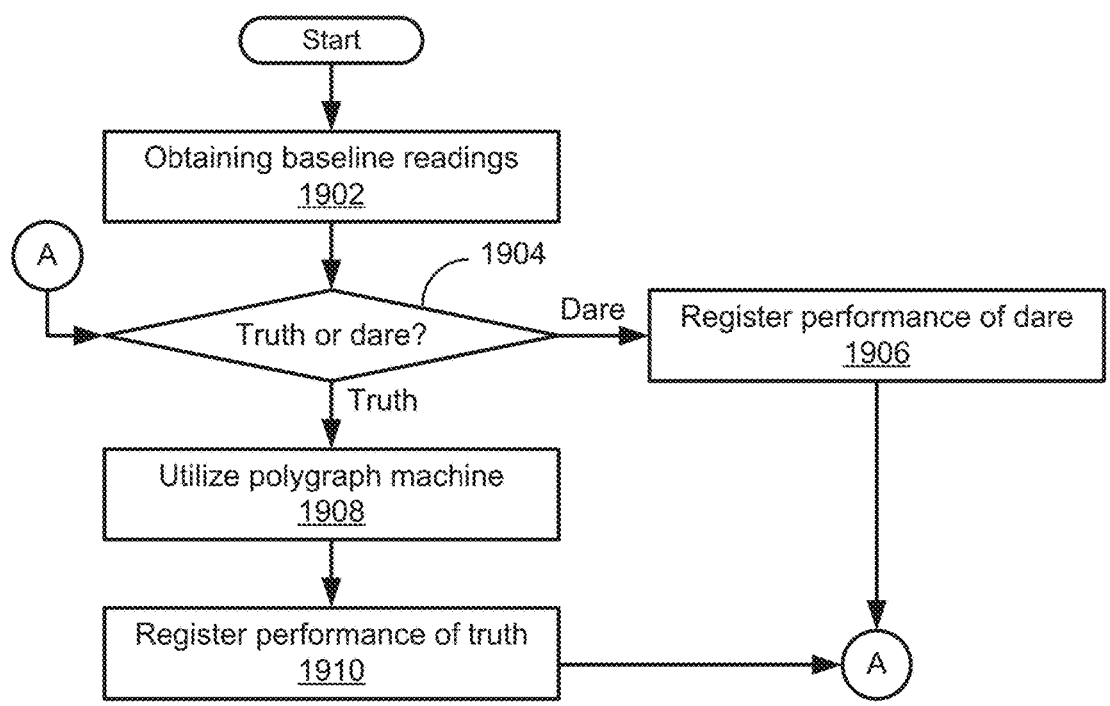
FIG. 19 depicts a flowchart of an example of a social game (truth or dare) played with at least one wireless state-maintaining social device and a polygraph machine.

FIG. 19 depicts a flowchart 1900 of an example of a social game (truth or dare) played with at least one wireless state-maintaining social device, such as the wireless state-maintaining social devices 1604 described with reference to FIG. 16, and a polygraph machine. In a specific implementation, the polygraph machine includes a wristband with a heartbeat and/or blood pressure sensor, a respiratory rate sensor, and a galvanic skin resistance sensor. In an alternative, the polygraph machine includes a smartphone capable of detecting heartbeat and/or blood pressure and respiratory rate and a wristband capable of detecting galvanic skin resistance. A polygraph machine utilizes at least three sensors: a heartbeat and/or blood pressure sensor, a respiratory rate sensor, and a galvanic skin resistance sensor, and can be assembled from the relevant sensors and an appropriately configured engine, which for the purposes of this example is assumed to be the gamification engine. Although galvanic skin resistance sensors are frequently unreliable, perfect reliability is not really needed in a game, so a wrist band can be provided for use in truth or dare to detect galvanic skin resistance despite its lack of reliability, data from which is received via a proximate device interface engine of a wireless state-maintaining social device. Advantageously, many people carry around smartphones capable of measuring two of the three parameters used by a polygraph machine, and the third can be provided relatively inexpensively via a wristband.

The flowchart 1900 starts at module 1902 with obtaining baseline readings. Baseline readings are obtained when a player's heartbeat, blood pressure, respiratory rate, and/or galvanic skin resistance are measured. Because this is a game, not all of the values need necessarily be measured, though the effectiveness of the polygraph (already of limited reliability in the best of circumstances) is further diminished. Alternative lie detection parameters can also be measured, if desired and, again, the parameters need not be reliable because the parameters are used in a game. A baselining program could also be used, such as an app on a smartphone, that could ask typical baselining questions to each player before the start of a game of truth or dare.

The flowchart 1900 continues to decision point 1904 where it is determined whether a player has elected truth or dare. If the player elects dare (1904—Dare), then the flowchart 1900 continues to module 1906 where performance of the dare is registered and returns to decision point 1904 and continues as described previously, but where a different player (typically) selects truth or dare. To complete a dare, the players will typically agree that a dare has been performed and then manipulate a wireless state-maintaining social device (e.g., by shaking it) to inform the gamification engine that the dare has been performed.

If the player elects truth (1904—Truth), then the flowchart 1900 continues to module 1908 where the polygraph machine is utilized to obtain a reading. It may be noted that, to the extent players have a dedicated device that senses heartbeat, blood pressure, respiratory rate, and/or galvanic skin resistance, the polygraph machine may be able to improve its predictive power over time. For example, a player's smartphone may record some of these parameters over time.

The flowchart 1900 then continues to module 1910 where performance of the truth is registered in accordance with the reading and then returns to decision point 1904 and continues as described previously. The reading can be binary (e.g., True or False), trinary (e.g., True, False, and Indeterminate), or some other value (e.g., probability of truth expressed as a percentage). In a specific implementation with binary results, where the truth of falsity is of equal probability, the player gets the benefit of the doubt and the performance is registered as True. In a specific implementation with trinary results, the gamification engine can favor "interesting" results, making the indeterminate result occur relatively infrequently (e.g., at most one in three) and calibrate results to give more definitive results if Indeterminate has come up before. In a specific implementation with probabilities, the results are likely interesting enough to simply display what is determined, though it may be desirable to increase certainty by over-estimating the predictive value of results if that would be more fun. The results of a truth response (e.g., True, False, Indeterminate, % likelihood of truth, etc.) are displayed by display engines of the wireless state-maintaining social device. In an implementation in which two wireless state-maintaining social devices are used, after module 1906 or 1910, a first player who challenged a second player with "truth or dare" hands one of the wireless state-maintaining social devices to a third player designated by the second player and the second player then gets to challenge the third player.

Referring once again to the example of FIG. 16, the proximate device interface engine 1616 can be configured to understand game board state by implementing passive or active sensors in a game board and pieces. For example, a chessboard can be made with sensors capable of determining what piece is in which square of the board. The wireless state-maintaining social devices 1604 can then provide hints that depend upon the player profile datastore 1608. For example, a novice who is playing a proficient player can occasionally be told to make a good move (likely through a smartphone that is analyzing the game if the wireless state-maintaining social devices 1604 have limited computing power). The proficient player can also be given limitations, like you cannot move a knight or a bishop, which may be random. This enables handicapping without actually removing pieces from the board. Of course, the rules of the game can also be changed, such as by giving a novice a random chance to get a piece back or make two moves in a row. The handicap can also take the form of trivia, only allowing a player to make a move if they answer a question correctly.

Another type of board game includes geographies, such as Risk, which can be combined with trivia. For example, if you want to move an army into an area, you may need to answer a general trivia question or perhaps a question about the area into which you are moving. The questions can be scaled to match a demographic (e.g., age). Where dice are used, the wireless state-maintaining social devices 1604 can include a dice roller. Where the number of dice varies, the number of shakes can be indicative of the number of dice rolls or a button can be pushed as many times as the number of dice. Results other than just the dice roll can also be added on a random basis (e.g., you get one additional army).

Such randomized results can be added to a wide variety of different boards, such as city block traversing games (e.g., Monopoly) that can be augmented with interesting dice rolling options such that each move is meaningful, but randomized events that are displayed with a dice roll. For example, the Chance and Community Chest spaces could be omitted from a Monopoly board and the results of such cards displayed with a subset of dice rolls, along with a probability that a player that lands on an owned property is "just visiting." The results can also be crafted specifically for particular player profiles. For example, younger players may get "luckier" than older players.

Another type of board game includes letterboards, such as Scrabble, which can be augmented to give hints based upon demographics (and perhaps even to allow children to use words from a source other than a game dictionary).

Figure 20:
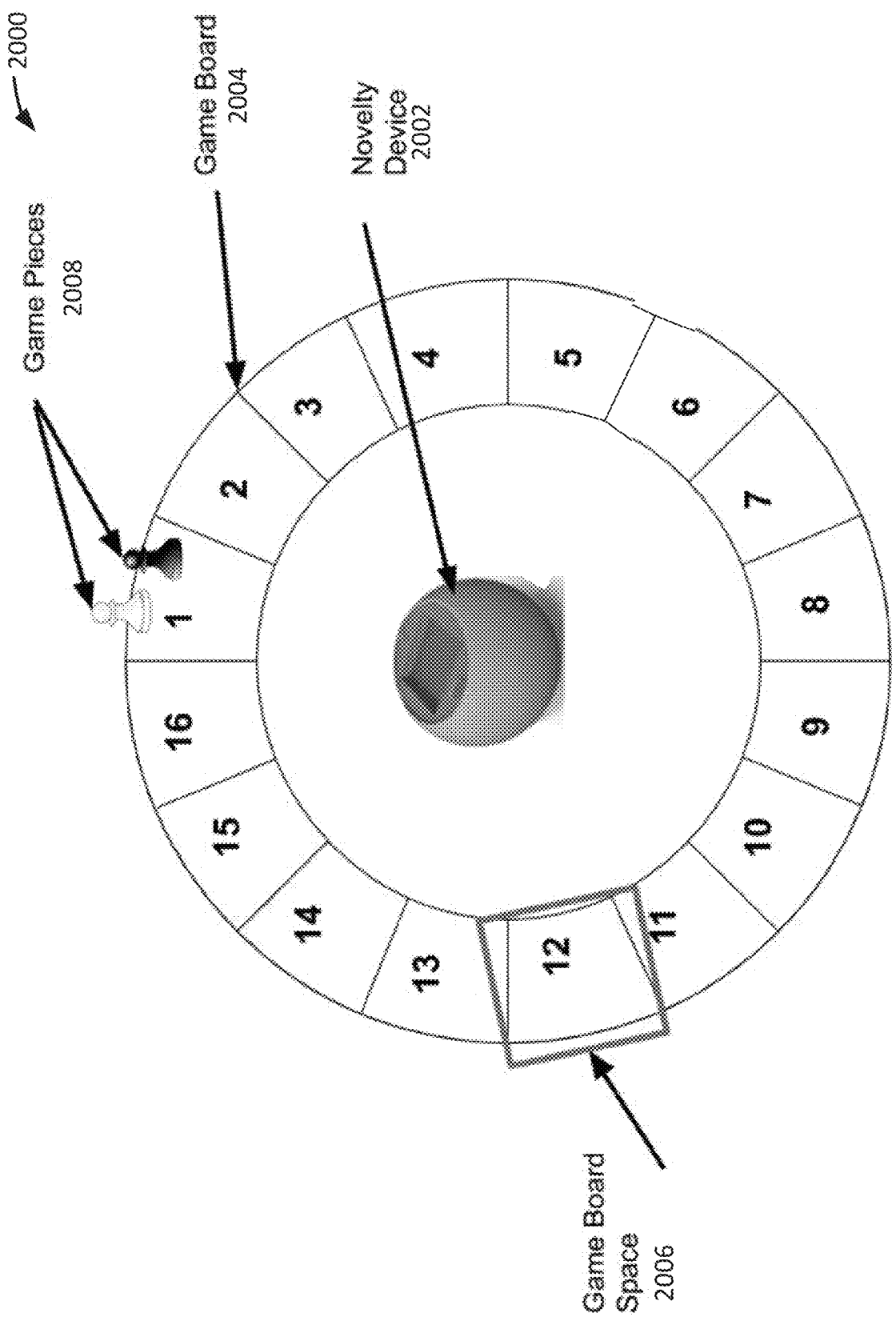
FIG. 20 depicts a diagram of an example of a gamification device and gameboard.

FIG. 20 depicts a diagram 2000 of an example of a gamification device and gameboard. The diagram 2000 includes a novelty device 2002, a game board 2004, a game board space 2006, and game pieces 2008.

In a specific implementation, a game comprises the novelty device 2002, the game board 2004 with distinct spaces including the game board space 2006, the playing pieces 2008, each of which is intended to represent a player, and a set of rules governing movement and achievement of points towards or victory or loss of points distancing victory, and a set of game conditions governing victory. The novelty device 2002 can be implemented as a gamification device, such as is described elsewhere in this paper. In a specific implementation, each space on the game board 2004 has one or more distinct notations (including colors and shapes and images) and a rule, either written on the space or noted in a separate rulebook, that can be applied to the game piece landing on that space. In alternatives, the game board can be of a variety of shapes and sizes with multiple spaces, each marked with a distinctive outline, color, or made otherwise distinguishable. The game pieces 2008 used to represent each player are distinctive in color, shape, or size.

One method governing movement of the game pieces 2008 from space to space is by which spaces share edges or sides and movement occurs sequentially from one adjoining space to the next based on instructions about direction or length of movement dictated by the novelty device 2002 after a player has interacted with it, such as the player shaking the novelty device 2002 and viewing its display. Other methods governing movement on the game board 2004 is through information presented on the novelty device 2002 corresponding to the distinct notations on a space after a player has interacted with it, such as the player shaking the novelty device 2002 and viewing its display. Victory conditions for the game include accumulation of points or reaching a specific space on the game board 2004. Points can be awarded, lost, or transferred during landing on game spaces due to passing over a space, landing on a space, correctly responding to questions presented to the player after interacting with the novelty device 2002, or direct information presented by the novelty device 2002.

Referring once again to the example of FIG. 16, the wireless state-maintaining social devices 1604 can also be used in more complex tabletop roleplaying games. For example, players can be assigned a role randomly through one of the wireless state-maintaining social devices 1604 (e.g., you are the Pilot, the Fighter, or some other class). Tiles can be placed and encounters can be added in accordance with a randomizer of the wireless state-maintaining social devices 1604. Information can also be conveyed to players, such as action order, messages, dice rolling results, rule assist (e.g., do this, then do that, then do the other), or the like, which can remove the necessity to look for dice, look up rules, or pass notes. Action order notification can be of particular importance when a single person is responsible for acting on behalf of multiple different creatures. In some games, a referee has more freedom than other players to fudge dice rolls. To avoid eliminating suspense, the referee could pre-record a gesture for loaded dice when the referee is concerned an encounter is too hard (causing the randomizer to roll lower) or to pre-record a gesture for loaded dice when an encounter is too easy, and then show the results for dramatic effect. The number and size of dice can be selected by tapping, pushing a button repeatedly, shaking, or the like.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

The invention claimed is:

1. A method comprising:
providing content data used in displaying customized messages within a list of customized messages to a customizable display system integrated as part of a gamification device, the customizable display system configured to display a first customized message from the list of customized messages using the content data;
receiving interaction data indicating how a user of the gamification device has physically manipulated the gamification device;
determining, based on the interaction data and an orientation of the gamification device, the customizable display system is facing a person;
determining, using content presentation rules, whether to display another message at the customizable display system in response to the interaction data indicating how the user has physically manipulated the gamification device and the determining the customizable display system is facing a person;
if it is determined to display the another message at the customizable display system in response to how the user has physically manipulated the gamification device and the determining the customizable display system is facing a person:
  selecting a second customized message from the list of customized messages to display at the customizable display system;
  providing a first presentation instruction indicating to display the second customized message to the customizable display system, the customizable display system further configured to display the second customized message in place of the first customized message using the content data in response to receiving the first presentation instruction.

2. The method of claim 1, wherein the first customized message is a riddle and the second customized message is a hint to the riddle.

3. The method of claim 1, wherein the customized messages and the list of customized messages are created by the user, the method further comprising:
receiving instructions from the user to configure the customizable display system to display the customized messages from the list of customized messages;
providing the content data used by the customizable display system to display the customized messages from the list of customized messages in response to the instructions received from the user.

4. The method of claim 1, further comprising:
providing additional content data used in displaying an advertisement to the customizable display system, the customizable display system further configured to display the advertisement using the additional content data;
determining, using the content presentation rules, whether to display the advertisement to the user in response to the interaction data indicating how the user has physically manipulated the gamification device;
if it is determined to display the advertisement at the customizable display system, providing a second presentation instruction to the customizable display system indicating to display the advertisement at the customizable display system, the customizable display system further configured to display the advertisement in place of either the first customized message or the second customized message instruction using the additional content data in response to receiving the second presentation instruction.

5. The method of claim 1, further comprising:
mapping the user to a persona according to market segmentation variables;
selecting an advertisement to display to the user based on the persona to which the user is mapped;
providing additional content data used in displaying the advertisement to the customizable display system, the customizable display system further configured to display the advertisement using the additional content data;
determining, using the content presentation rules, whether to display the advertisement to the user in response to the interaction data indicating how the user has physically manipulated the gamification device;
if it is determined to display the advertisement at the customizable display system, providing a second presentation instruction to the customizable display indicating to display the advertisement at the customizable display system, the customizable display system further configured to display the advertisement in place of either the first customized message or the second customized message using the additional content data in response to receiving the second presentation instruction.

6. The method of claim 1, further comprising:
mapping the user to a persona according to market segmentation variables;
selecting additional content to reproduce for the user at the customizable display system based on the persona to which the user is mapped;
providing additional content data used in reproducing the additional content to the customizable display system, the customizable display system further configured to reproduce the additional content using the additional content data;
determining, using the content presentation rules, whether to reproduce the additional content for the user in response to the interaction data indicating how the user has physically manipulated the gamification device;
if it is determined to reproduce the additional content at the customizable display system, providing a second presentation instruction to the customizable display indicating to reproduce the additional content at the customizable display system, the customizable display system further configured to reproduce the additional content using the additional content data in response to receiving the second presentation instruction.

7. The method of claim 1, wherein the content presentation rules specify pseudo-randomly selecting the another message to display at the customizable display system in response to the interaction data indicating how the user has physically manipulated the gamification device.

8. The method of claim 1, wherein the customizable display system includes an energy harvester configured to convert kinetic energy generated by the user physically moving the gamification device into electrical energy, the electrical energy used to power the customizable display system.

9. The method of claim 1, further comprising:
receiving environmental conditions data indicating environmental conditions at the gamification device;
determining, using the content presentation rules, whether to reproduce additional content at the customizable display system in response to the environmental conditions data indicating the environmental conditions at the gamification device;
providing a second presentation instruction indicating to reproduce the additional content to the customizable display system, if it is determined to reproduce additional content at the customizable display system in response to the environmental conditions at the gamification device, the customizable display system further configured to reproduce the additional content in response to receiving the second presentation instruction.

10. The method of claim 1, wherein the content presentation rules are generated, at least in part, based on input from the user.

11. A system comprising:
one or more processors; and
memory storing instructions that, when executed by the one or more processors, cause the system to perform:
providing content data used in displaying customized messages within a list of customized messages to a customizable display system integrated as part of a gamification device, the customizable display system configured to display a first customized message from the list of customized messages using the content data;
receiving interaction data indicating how a user of the gamification device has physically manipulated the gamification device;
determining, based on the interaction data and an orientation of the gamification device, the customizable display system is facing a person;
determining, using content presentation rules, whether to display another message at the customizable display system in response to the interaction data indicating how the user has physically manipulated the gamification device and the determining the customizable display system is facing a person;
if it is determined to display the another message at the customizable display system in response to how the user has physically manipulated the gamification device and the determining the customizable display system is facing a person:
selecting a second customized message from the list of customized messages to display at the customizable display system;
providing a first presentation instruction indicating to display the second customized message to the customizable display system, the customizable display system further configured to display the second customized message in place of the first customized message using the content data in response to receiving the first presentation instruction.

12. The system of claim 11, wherein the first customized message is a riddle and the second customized message is a hint to the riddle.

13. The system of claim 11, wherein the customized messages and the list of customized messages are created by the user, the instructions further causing the system to perform:
receiving instructions from the user to configure the customizable display system to display the customized messages from the list of customized messages;
providing the content data used by the customizable display system to display the customized messages from the list of customized messages in response to the instructions received from the user.

14. The system of claim 11, the instructions further causing the system to perform:
  providing additional content data used in displaying an advertisement to the customizable display system, the customizable display system further configured to display the advertisement using the additional content data;
  determining, using the content presentation rules, whether to display the advertisement to the user in response to the interaction data indicating how the user has physically manipulated the gamification device;
  providing a second presentation instruction to the customizable display indicating to display the advertisement at the customizable display system, if it is determined to display the advertisement at the customizable display system, the customizable display system further configured to display the advertisement in place of either the first customized message or the second customized message instruction using the additional content data in response to receiving the second presentation.

15. The system of claim 11,
the instructions further causing the system to perform:
  selecting an advertisement to display to the user based on the persona to which the user is mapped;
  providing additional content data used in displaying the advertisement to the customizable display system, the customizable display system further configured to display the advertisement using the additional content data;
  determining, using the content presentation rules, whether to display the advertisement to the user in response to the interaction data indicating how the user has physically manipulated the gamification device;
  providing a second presentation instruction to the customizable display indicating to display the advertisement at the customizable display system, if it is determined to display the advertisement at the customizable display system, the customizable display system further configured to display the advertisement in place of either the first customized message or the second customized message using the additional content data in response to receiving the second presentation instruction.

16. The system of claim 11, the instructions further causing the system to perform:
  selecting additional content to reproduce for the user at the customizable display system based on the persona to which the user is mapped;
  providing additional content data used in reproducing the additional content to the customizable display system, the customizable display system further configured to reproduce the additional content using the additional content data;
  determining, using the content presentation rules, whether to reproduce the additional content for the user in response to the interaction data indicating how the user has physically manipulated the gamification device;
  providing a second presentation instruction to the customizable display indicating to reproduce the additional content at the customizable display system, if it is determined to reproduce the additional content at the customizable display system, the customizable display system further configured to reproduce the additional content using the additional content data in response to receiving the second presentation instruction.

17. The system of claim 11, wherein the content presentation rules specify pseudo-randomly selecting the another message to display at the customizable display system in response to the interaction data indicating how the user has physically manipulated the gamification device.

18. The system of claim 11, wherein the customizable display system includes an energy harvester configured to convert kinetic energy generated by the user physically moving the gamification device into electrical energy, the electrical energy used to power the customizable display system.

19. The system of claim 11, the instructions further causing the system to perform:
  receiving environmental conditions data indicating environmental conditions at the gamification device;
    determining, using the content presentation rules, whether to reproduce additional content at the customizable display system in response to the environmental conditions data indicating the environmental conditions at the gamification device;
  providing a second presentation instruction indicating to reproduce the additional content to the customizable display system, if it is determined to reproduce additional content at the customizable display system in response to the environmental conditions at the gamification device, the customizable display system further configured to reproduce the additional content in response to receiving the second presentation instruction.

20. A system comprising:
  means for providing content data used in displaying customized messages within a list of customized messages to a customizable display system integrated as part of a gamification device, the customizable display system configured to display a first customized message from the list of customized messages using the content data;
  means for receiving interaction data indicating how a user of the gamification device has physically manipulated the gamification device;
  means for determining, based on the interaction data and an orientation of the gamification device, the customizable display system is facing a person;
  means for determining, using content presentation rules, whether to display another message at the customizable display system in response to the interaction data indicating how the user has physically manipulated the gamification device and the determining the customizable display system is facing a person;
  means for selecting a second customized message from the list of customized messages to display at the customizable display system, if it is determined to display the another message at the customizable display system in response to how the user has physically manipulated the gamification device and the determining the customizable display system is facing a person;
  means for providing a first presentation instruction indicating to display the second customized message to the customizable display system, if it is determined to display the another message at the customizable display system in response to how the user has physically manipulated the gamification device, the customizable display system further configured to display the second customized message in place of the first customized message using the content data in response to receiving the first presentation instruction.

\* \* \* \* \*